US012141422B2

(12) United States Patent
Li

(10) Patent No.: US 12,141,422 B2
(45) Date of Patent: Nov. 12, 2024

(54) VIDEO EDITING AND PLAYING METHOD, APPARATUS, DEVICE AND MEDIUM

(71) Applicant: BEIJING BYTEDANCE NETWORK TECHNOLOGY CO., LTD., Beijing (CN)

(72) Inventor: Yujie Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/538,893

(22) Filed: Nov. 30, 2021

(65) Prior Publication Data

US 2022/0283697 A1 Sep. 8, 2022

(30) Foreign Application Priority Data

Mar. 2, 2021 (CN) .......................... 202110231835.8

(51) Int. Cl.
*G06F 3/04845* (2022.01)
*G11B 27/031* (2006.01)

(52) U.S. Cl.
CPC ........ *G06F 3/04845* (2013.01); *G11B 27/031* (2013.01)

(58) Field of Classification Search
CPC .......................... G06F 3/04845; G11B 27/031
See application file for complete search history.

(56) References Cited

U.S. PATENT DOCUMENTS

| 7,027,101 | B1 | 4/2006 | Sloo et al. | |
| 8,667,406 | B1* | 3/2014 | Thakur | G06F 3/0481 715/764 |
| 9,965,136 | B1* | 5/2018 | Brichter | G06F 3/0485 |
| 2004/0261012 | A1* | 12/2004 | Balsiger | G06F 9/451 715/255 |
| 2009/0228948 | A1* | 9/2009 | Guarin | H04N 5/278 725/137 |
| 2009/0293007 | A1* | 11/2009 | Duarte | G06F 9/451 715/767 |
| 2013/0209058 | A1* | 8/2013 | Cho | H04N 21/4884 386/230 |

(Continued)

FOREIGN PATENT DOCUMENTS

| CN | 103257821 A | 8/2013 |
| CN | 104516627 A | 4/2015 |

(Continued)

OTHER PUBLICATIONS

International Search Report issued May 12, 2022 in International Application No. PCT/CN2022/075452.

(Continued)

*Primary Examiner* — Andrew T Chiusano

(57) ABSTRACT

The disclosure relates to a video editing and playing method, apparatus, device and medium. The video editing method comprises the steps of displaying a target video; displaying a target video text in a first video picture area of the target video; and when a moving operation on the target video text is detected, moving the target video text from the first video picture area to a second video picture area of the target video for displaying in the case where the moving operation is determined to be used for moving the target video text to the second video picture area.

16 Claims, 10 Drawing Sheets

(56) References Cited

U.S. PATENT DOCUMENTS

| | | | |
|---|---|---|---|
| 2015/0097869 A1 | 4/2015 | Oh et al. | |
| 2017/0024110 A1* | 1/2017 | Xu | G11B 27/34 |
| 2017/0223303 A1 | 8/2017 | Chaudhri | |
| 2018/0241961 A1 | 8/2018 | Choi et al. | |
| 2019/0037168 A1 | 1/2019 | Tsukagoshi | |
| 2019/0114047 A1 | 4/2019 | Kikin-Gil et al. | |
| 2019/0394419 A1* | 12/2019 | Zhang | H04N 21/44008 |
| 2020/0252696 A1 | 8/2020 | Feng | |
| 2020/0365188 A1* | 11/2020 | Brinkman, Jr. | H04N 21/8549 |
| 2021/0042001 A1* | 2/2021 | Tsuruta | G06F 40/18 |

FOREIGN PATENT DOCUMENTS

| | | | |
|---|---|---|---|
| CN | 105872710 A | 8/2016 | |
| CN | 107454255 A | 12/2017 | |
| CN | 107920270 A | 4/2018 | |
| CN | 108093310 A | 5/2018 | |
| CN | 108469941 A | 8/2018 | |
| CN | 108886627 A | 11/2018 | |
| CN | 109462692 A | 3/2019 | |
| CN | 110620946 A | 12/2019 | |
| CN | 111225288 A | 6/2020 | |
| CN | 112153479 A | 12/2020 | |

OTHER PUBLICATIONS

Notification to Grant Patent Right and Search Report issued May 9, 2023 in Chinese Application No. 202110231835.8, with English translation of Search Report (5 pages).

\* cited by examiner

VIDEO EDITING AND PLAYING METHOD, APPARATUS, DEVICE AND MEDIUM

CROSS-REFERENCE TO RELATED APPLICATIONS

The present application is based on and claims priority to Chinese Patent Application No. 202110231835.8 filed on Mar. 2, 2021, the disclosure of which is incorporated by reference herein in its entirety.

TECHNICAL FIELD

The present disclosure relates to the multimedia technical field, and in particular, to a video editing and playing method, apparatus, device and medium.

BACKGROUND

With the rapid development of computer technology and mobile communication technology, various video platforms based on electronic devices are widely applied, and the daily life of people is greatly enriched.

Currently, video texts in a video are all displayed at specified positions in a unified manner, for example, subtitles are all displayed at the bottom of the video, and bullet screens are all displayed at the top of the video. However, if the main content of the video is also displayed at these locations, the main content may be obscured by the video text, reducing the user's experience.

SUMMARY

In order to solve the above technical problem, or at least partially solve the above technical problem, the present disclosure provides a video editing and playing method, apparatus, device and medium.

In a first aspect, the present disclosure provides a video editing method, comprising:
 displaying a target video;
 displaying a target video text in a first video picture area of the target video;
 upon detection of a moving operation on the target video text, in the case where it is determined that the moving operation is used to move the target video text to a second video picture area of the target video, moving the target video text from the first video picture area to the second video picture area for display.

In a second aspect, the present disclosure provides a video playing method, comprising:
 playing a target video;
 in the playing process of the target video, displaying a target video text in a second video picture area of the target video;
 wherein the second video picture area is a video picture area to which the target video text is moved from a first video picture area, which is determined in the process of video editing of the target video.

In a third aspect, the present disclosure provides a video editing apparatus, comprising:
 a first display unit configured to display a target video;
 a second display unit configured to display a target video text in a first video picture area of the target video;
 a third display unit configured to, upon detection of a moving operation on the target video text, in a case where it is determined that the moving operation is used to move the target video text to a second video picture area of the target vide, move the target video text from the first video picture area to the second video picture area for display.

In a fourth aspect, the present disclosure provides a video playing apparatus, comprising:
 a video play unit configured to play a target video;
 a fourth display unit configured to, in the playing process of the target video, display a target video text in a second video picture area of the target video;
 wherein the second video picture area is a video picture area to which the target video text is moved from a first video picture area, which is determined in the process of video editing of the target video.

In a fifth aspect, the present disclosure provides an electronic device, comprising:
 a processor;
 a memory for storing executable instructions;
 wherein the processor is configured to read the executable instructions from the memory, and execute the executable instructions to implement the video editing method of the first aspect or the video playing method of the second aspect.

In a sixth aspect, the present disclosure provides a computer readable storage medium storing a computer program which, when executed by a processor, causes the processor to implement the video editing method of the first aspect or the video playing method of the second aspect.

Compared with the prior art, the technical solution provided by the embodiments of the disclosure has at least the following advantages:

The video editing and playing method of the embodiments of the present disclosure can display a target video text in a first video picture area of a target video when the target video is displayed, and can, upon detection of a moving operation on the target video text, in the case where it is determined that the moving operation is used to move the target video text to a second video picture area of the target video, move the target video text from the first video picture area to the second video picture area for display, so as to update the display position of the target video text from the first video picture area to the second video picture area, so that the target video text can be directly displayed in the second video picture area of the target video in the playing process of the target video when the target video is subsequently played, thereby adjusting the display position of the target video text as required, for example, if the main content of the video is in the first video picture area, the video text can be moved to the second video picture area for display, so that the main content of the video is prevented from being obscured by the video text, and the video viewing experience of a user is improved.

BRIEF DESCRIPTION OF THE DRAWINGS

The above and other features, advantages, and aspects of embodiments of the present disclosure will become more apparent by referring to the following detailed description when taken in combination with the accompanying drawings. Throughout the drawings, the same or similar reference signs refer to the same or similar elements. It should be understood that the drawings are schematic and that the originals and elements are not necessarily drawn to scale.

DETAILED DESCRIPTIONS

Figure 1:
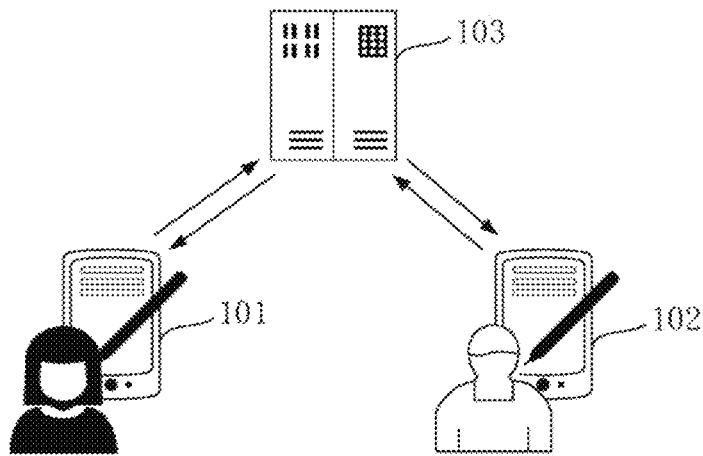
FIG. 1 is an architecture diagram of a video platform provided by an embodiment of the present disclosure.

Embodiments of the present disclosure will be described in more detail below with reference to the accompanying drawings. Although certain embodiments of the present disclosure are shown in the drawings, it should be understood that the present disclosure may be embodied in various forms and should not be construed as limited to the embodiments set forth herein, but rather these embodiments are provided for a more complete and thorough understanding of the present disclosure. It should be understood that the drawings and embodiments of the present disclosure are for illustration purposes only and are not intended to limit the scope of the disclosure.

It should be understood that the various steps recited in the method embodiments of the present disclosure may be performed in a different order, and/or performed in parallel. Moreover, the method embodiments may include additional steps and/or omit performing the illustrated steps. The scope of the present disclosure is not limited in this respect.

The term "comprise" and variations thereof as used herein are open-ended, i.e., "comprise but not limited to". The term "based on" is "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that the terms "first", "second", and the like in the present disclosure are only used for distinguishing different apparatus, modules or units, and are not used for limiting the order of functions performed by the apparatus, modules or units or interdependence thereof.

It is noted that references to "a" or "a plurality of" mentioned in the present disclosure are intended to be illustrative rather than limiting, and those skilled in the art will appreciate that unless otherwise clearly indicated in the context, they should be understood as "one or more".

The names of messages or information exchanged between apparatus in the embodiments of the present disclosure are for illustrative purposes only, and are not intended to limit the scope of the messages or information.

At present, video texts in a video, such as a plug-in video text, are all uniformly displayed at specified positions, such as subtitles are all displayed at the bottom of the video, and bullet screens are all displayed at the top of the video. If the main content of the video is also displayed at the display position of the video text within most of the playing time of the video, the main content may be obscured by the video text, which reduces the user experience.

In order to solve the above problem, embodiments of the present disclosure provide a video editing and playing method, apparatus, device and medium capable of changing a display position of a video text.

The video editing and play method provided by the present disclosure can be applied to the architecture shown in FIG. 1, and is specifically described in detail with reference to FIG. 1.

FIG. 1 shows an architecture diagram of a video platform provided in an embodiment of the present disclosure.

As shown in FIG. 1, the architecture of the video platform may include at least one first electronic device 101 and at least one second electronic device 102 in the client side, and at least one server 103 on the server side. The first electronic device 101, the second electronic device 102, and the server 103 may establish connection and perform information interaction through a network Protocol, such as a hypertext Transfer Protocol over Secure Socket Layer (HTTPS), respectively. The first electronic device 101 and the second electronic device 102 may respectively include a mobile phone, a tablet computer, a desktop computer, a notebook computer, a vehicle-mounted terminal, a wearable electronic device, an all-in-one machine, a smart home device and other devices with communication functions, and may also include a virtual machine or a simulator-simulated device. The server 103 may include a device with storage and computing functions, such as a cloud server or a server cluster.

Based on the above architecture, the first user can log onto the video platform using the first electronic device 101, make a video work on the video platform, and publish the video work on the video platform. The first electronic device 101 may send the video work published by the first user to the server 103 of the video platform for storage. The second user may log onto the video platform using the second electronic device 102 and view the video work published by the first user on the video platform. The second electronic device 102 may obtain the video work released by the first user from the server 103 and play the obtained video work.

In order to improve the user's experience, in a process that the first user makes a video work through the first electronic device 101, the first electronic device 101 may display a target video text in a first video picture area of a target video in the process of displaying the target video, where the first video picture area is a display position of the target video text corresponding to the target video. If the first user wants to move the display position of the target video text from the first video picture area to the second video picture area, the first user may input a moving operation on the target video text to the first electronic device 101. When the first electronic device 101 detects a moving operation on the target video text, if it is determined that the moving operation is used to move the target video text to the second video picture area of the target video, the target video text may be moved from the first video picture area to the second video picture area for display, and then the display position of the target video text is updated from the first video picture area to the second video picture area, so that the first user may edit the display position of the target video text as needed. For example, if the main content of the video is in the first video picture area, the first electronic device 101 may move the display position of the target video text to the second video picture area through the movement of the target video text by the user, so as to adjust the display position of the target video text, thereby avoiding the obstruction of the main content of the video by the target video text.

Further, in the process that the second user views the video work through the second electronic device 102, the second electronic device 102 may display the target video text in a second video picture area of the target video in the process of playing the target video, where the second video picture area may be a video picture area to which the target video text is moved from a first video picture area, which is determined in the process of video editing the target video. Therefore, if the display position of the target video text is updated from the first video picture area to the second video picture area in the process of video editing the target video, in the process of playing the target video, the second electronic device 102 may display the target video text in the second video picture area updated in the process of video editing, so that the second electronic device 102 may display the target video text based on the adjusted display position of the target video text. For example, if the main content of the video is in the first video picture area, the main content of the video can be prevented from being obscured by the target video text by displaying the target video text in the second video picture area, so that the video viewing experience of the user is improved.

According to the above architecture, the following first describes a video editing method provided by an embodiment of the present disclosure with reference to FIGS. 2 to 10. In the embodiment of the present disclosure, the video editing method may be performed by an electronic device, for example, the video editing method may be performed by the first electronic device 101 in the client side illustrated in FIG. 1. The electronic device may include a mobile phone, a tablet computer, a desktop computer, a notebook computer, a vehicle-mounted terminal, a wearable electronic device, an all-in-one machine, a smart home device and other devices with communication functions, and may also include a virtual machine or a simulator-simulated device.

Figure 2:
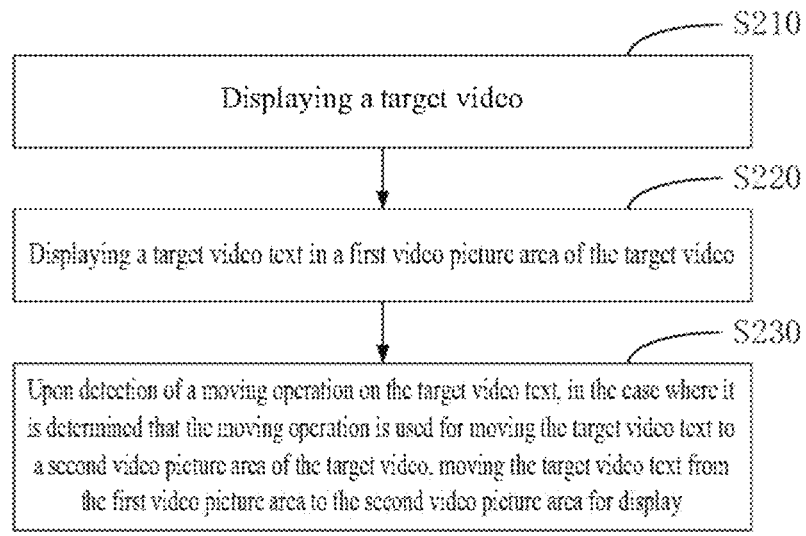
FIG. 2 is a schematic flow diagram of a video editing method provided by an embodiment of the present disclosure.

FIG. 2 shows a schematic flow diagram of a video editing method provided by an embodiment of the present disclosure.

As shown in FIG. 2, the video editing method may include the following steps.

S210, displaying a target video.

In an embodiment of the present disclosure, the electronic device may display a target video to be edited.

In some embodiments, S210 may specifically include displaying the target video in a first target interface.

The first target interface can be any video interface. For example, the first target interface may be a video editing interface.

S220, displaying a target video text in a first video picture area of the target video.

In an embodiment of the present disclosure, in the process of displaying the target video, the electronic device may superimpose and display the target video text on the video picture of the target video in the first video picture area of the target video, so that the target video text may be surrounded by the closed first video picture area.

The target video text may include subtitles, bullet screens, and other texts that need to be continuously displayed on the video content, and the present disclosure does not limit the target video text.

Further, the target video text may include plug-in video text such as plug-in subtitles, plug-in bullet screens, and the like.

In an embodiment of the present disclosure, the first video picture area may be a display position of the target video text corresponding to the target video before the target video text is moved.

In some embodiments, the display position of the target video text may be a subtitle display position in the case where the target video text includes subtitles, and may be a bullet screen display position in the case where the target video text includes bullet screens.

In some embodiments, in the case where the target video already has the target video text, the video data to which the target video belongs may carry a display position of the target video text.

In some embodiments, the electronic device may acquire a display position of the target video text in the video data to which the target video belongs before displaying the target video, and then display the target video text in a first video picture area of the target video in the case where the display position of the target video text is the first video picture area in the process of displaying the target video.

In other embodiments, in the case where the target video does not have a target video text, the user may add a target video text to the target video, at this time, the target video text added by the user may be displayed in the first video picture area. In some embodiments, in the process of displaying the target video by the electronic device, the user may input a text addition operation on the target video to the electronic device to add the target video text to the target video. When the electronic device detects a text addition operation, the first video picture area may be taken as a text display position of the target video. The electronic device may display the target video text added by the user in the first video picture area of the target video.

Taking the target video text being subtitles as an example, after a user enters a video editing interface for a target video by using an electronic device, the electronic device may display the target video in the video editing interface. At this time, the user may input a subtitle addition operation for the target video to the electronic device, such as clicking a subtitle addition button within the video editing page and inputting a subtitle within a subtitle input box to add a subtitle to the target video. When the electronic device detects the subtitle addition operation, the first video picture area can be used as a subtitle display position of the target video, thereby displaying the subtitle added by the user in the first video picture area of the target video.

In an embodiment of the present disclosure, the first video picture area may be any video picture area preset as needed, and is not limited herein.

S230, upon detection of a moving operation on the target video text, in the case where it is determined that the moving operation is used for moving the target video text to a second video picture area of the target video, moving the target video text from the first video picture area to the second video picture area for display.

In an embodiment of the disclosure, in the process of the electronic device displaying the target video text in the first video picture area, if the user wants to change the display position of the target video text, a moving operation on the target video text may be input to the electronic device. When the electronic device detects a moving operation on the target video text, if the moving operation is determined to be used for moving the target video text to a second video picture area of the target video, the target video text may be moved from the first video picture area to the second video picture area for display, i.e., the target video text is moved to be superimposed and displayed on the video picture of the target video in the second video picture area, and the display position of the target video text is updated from the first video picture area to the second video picture area; if it is determined that the moving operation is used for moving the target video text to the first video picture area, the target video text may continue to be displayed in the first video picture area and, through the operations described above, the display position of the target video text can be determined by the user, and the use experience of the user is improved.

In some embodiments, the user may also input a moving operation on the target video text to the electronic device during the process of displaying and playing the target video. In this case, the electronic device may continuously detect the operation of the user during the playing of the target video.

In an embodiment of the present disclosure, the second video picture area may be any video picture area different from the first video picture area, which is preset as needed, and is not limited herein.

In an embodiment of the present disclosure, the moving operation may be an operation for moving the target video text in the video picture of the target video. In some embodiments, the moving operation may include a drag operation on the target video text.

In these embodiments, in the process of detecting the drag operation on the target video text, the electronic device may control the target video text to move in real time following the real-time drag position of the drag operation.

In these embodiments, in the case where the moving operation includes a drag operation on the target video text, at the end of the drag operation, the electronic device may determine, according to the drag operation on the target video text, whether the moving operation is to move the target video text from the first video picture area to a second video picture area of the target video or to keep the target video text in the first video picture area for display.

Further, the determining that the moving operation is used for moving the target video text to the second video picture area of the target video in S230 may specifically include:

when the drag operation ends, acquiring a real-time drag position of the drag operation and a real-time drag speed of the drag operation;

performing a weighted summation calculation on the real-time drag position and the real-time drag speed to obtain an operation weight of the drag operation;

and in the case where the operation weight indicates that the target video text is displayed in the second video picture area, determining that the moving operation is used for moving the target video text to the second video picture area for display.

Specifically, the description is given by taking the user dragging the target video text with a finger as an example. When the drag operation ends, namely the user releases his hand to finish the drag operation, the electronic device can acquire the real-time drag position of the drag operation, namely the finger touch position when the user releases his hand, and the real-time drag speed of the drag operation, namely the finger moving speed when the user releases his hand, and the real-time drag speed can also indicate the real-time moving direction of the drag operation, namely the finger moving direction when the user releases his hand. Then, the electronic device may perform a weighted summation calculation on the end position and the real-time moving speed according to a preset position weight corresponding to the real-time drag position and a preset speed weight corresponding to the real-time drag speed to obtain an operation weight of the drag operation, thereby determining a video picture area corresponding to the operation weight according to a corresponding relationship between the preset weight and the video picture area. In the case where it is determined that the video picture area corresponding to the operation weight is the second video picture area, the electronic device may determine that the operation weight indicates that the target video text is displayed in the second video picture area, and further determine that the moving operation is used for moving the target video text from the first video picture area to the second video picture area, so that the electronic device can automatically move the target video text from the first video picture area to the second video picture area for display; in the case where it is determined that the video picture area corresponding to the operation weight is the first video picture area, the electronic device can determine that the operation weight indicates that the target video text is displayed in the first video picture area, and further determine that the moving operation is used for keeping the target video text in the first video picture area for display, so that the electronic device can move the target video text back to the first video picture area for display.

Thus, in an embodiment of the present disclosure, in the case where the moving operation includes a drag operation on the target video text, when the drag operation is ended, that is, when the user releases his hand to end the drag operation, even if the real-time drag position of the drag operation, namely the finger touch position when the user releases his hand, is not located in any video picture area of the first video picture area and the second video picture area, the electronic device may automatically determine the video picture area corresponding to the drag operation of the user, and then move the target video text to the video picture area corresponding to the drag operation.

It should be noted that the drag operation is not limited to the user's finger dragging, and may also include other various types of drag operations, which are not limited herein.

In other embodiments, the moving operation may also include a movement trigger operation on the target video text and a position selection operation on the position to be moved.

The movement trigger operation may specifically include an operation to trigger movement control on the target video text, such as clicking, double-clicking, and long-pressing on the target video text, and may also include a trigger operation on a movement trigger control, such as a text movement button, which is not limited herein. The position selection operation may include operations such as clicking, double-clicking, and long-pressing the position to be moved to select the position to be moved, which is not limited here.

In these embodiments, at the end of the moving operation, the electronic device may determine whether the moving operation is to move the target video text from the first video picture area to the second video picture area of the target video or to keep the target video text in the first video picture area for display according to the selected position to be moved.

Further, in an embodiment of the present disclosure, in the case where the electronic device moves the target video text from the first video picture area to the second video picture area for display, the electronic device can update the display position of the target video text from the first video picture area to the second video picture area, so as to update the display position of the target video text in the video data to which the target video belongs from the first video picture area to the second video picture area; in the case where the electronic device continues to display the target video text in the first video picture area, it is not necessary to update the display position of the target video text, whereby it is not necessary to update the display position of the target video text in the video data to which the target video belongs, and the display position of the target video text may be maintained as the first video picture area.

In some embodiments, after the moving operation is ended, in the case where the electronic device moves the target video text from the first video picture area to the second video picture area for display, the electronic device may automatically update the display position of the target video text from the first video picture area to the second video picture area.

In other embodiments, after the moving operation is ended, if the user completes video editing on the target video, he may input a video publishing operation to the target video, where the video publishing operation may be a click operation on a video publishing control for triggering video publishing, so that the electronic device updates the display position of the target video text from the first video picture area to the second video picture area after detecting the video publishing operation on the target video, and thus the target video text is displayed in the second video picture area in the process of the target video being played.

In an embodiment of the present disclosure, a target video text can be displayed in a first video picture area of a target video when the target video is displayed, and when a moving operation on the target video text is detected, in a case where it is determined that the moving operation is used to move the target video text to a second video picture area of the target video, the target video text can be moved from the first video picture area to the second video picture area for display, so as to update the display position of the target video text from the first video picture area to the second video picture area, so that the target video text can be displayed in the second video picture area of the target video in the playing process of the target video when the target video is subsequently played, thereby adjusting the display position of the target video text as required, for example, if the main content of the video is in the first video picture area, the video text can be moved to the second video picture area for display, so that the main content of the video is prevented from being obscured by the video text, and the video viewing experience of a user is improved.

In another embodiment of the present disclosure, to further improve the video viewing experience of the user, the area positions of the first video picture area and the second video picture area within the first target interface and the display mode of the target video text in the first video picture area and the second video picture area may be designed.

In an embodiment of the present disclosure, in the case where the target video is displayed in the first target interface, the first target interface may further have a first preset reference line, wherein relative positions between the first video picture area and the first preset reference line and between the second video picture area and the first preset reference line may be respectively located on two sides of the first preset reference line.

In some embodiments of the present disclosure, the first video picture area and the second video picture area may be respectively located on two sides of the first preset reference line, so that the relative positions between the first video picture area and the first preset reference line and between the second video picture area and the first preset reference line may be respectively located on two sides of the first preset reference line.

In some embodiments, the first preset reference line may be arranged in a horizontal direction of the first target interface. At this time, the first preset reference line can divide the first target interface into two display areas, i.e., an upper and a lower display area, so that the first video picture area and the second video picture area are each located in one display area.

In some embodiments, the first preset reference line may include a horizontal center line of the first target interface. At this time, the horizontal center line of the first target interface may divide the first target interface into two display areas, i.e., an upper display area and a lower display area, and the first video picture area and the second video picture area are each located in one display area.

In other embodiments, the first preset reference line may be arranged in a vertical direction of the first target interface. At this time, the first preset reference line may divide the first target interface into two display areas, i.e., a left display area and a right display area, and the first video picture area and the second video picture area are each located in one display area.

In some embodiments, the first preset reference line may include a vertical center line of the first target interface. At this time, the vertical center line of the first target interface may divide the display screen into two display areas, i.e., a left display area and a right display area, such that the first video picture area and the second video picture area are each located in one display area.

In other embodiments of the present disclosure, the first video picture area may be divided into a first subarea located on a first side of the first preset reference line and a second subarea located on a second side of the first preset reference line by the first preset reference line, the second video picture area may be divided into a third subarea located on the first side of the first preset reference line and a fourth subarea located on the second side of the first preset reference line by the first preset reference line, the first subarea is larger than the second subarea, and the fourth subarea is larger than the third subarea, such that the first video picture area has a larger proportion on the first side of the preset reference line and the second video picture area has a larger proportion on the second side of the first preset reference line, that is, most areas of the first video picture area are located on the first side of the first preset reference line, and most areas of the second video picture area are located on the second side of the first preset reference line, so that the relative positions between the first video picture area and the first preset reference line and between the second video picture area and the first preset reference line may be respectively located on two sides of the first preset reference line.

In some embodiments, the first preset reference line may be arranged in a horizontal direction of the first target interface. At this time, the first preset reference line can divide the first target interface into two display areas, i.e., an upper and a lower display area, so that most areas of the first video picture area and most areas of the second video picture area are each located in one display area.

In some embodiments, the first preset reference line may include a horizontal center line of the first target interface. At this time, the horizontal center line of the display screen may divide the first target interface into two display areas, i.e., an upper and a lower display area, so that most areas of the first video picture area and most areas of the second video picture area are each located in one display area.

In other embodiments, the first preset reference line may be arranged in a vertical direction of the first target interface. At this time, the first preset reference line can divide the first target interface into two display areas, i.e., a left and a right display area, so that most areas of the first video picture area and most areas of the second video picture area are each located in one display area.

In some embodiments, the first preset reference line may be a vertical center line of the first target interface. At this time, the vertical center line of the display screen may divide the first target interface into two display areas, i.e., a left display area and a right display area, such that most areas of the first video picture area and most areas of the second video picture area are each located in one display area.

In an embodiment of the present disclosure, S220 may specifically include, in the first video picture area, displaying the target video text in alignment with a first area boundary of the first video picture area, the first area boundary being an area boundary of the first video picture area far away from the first preset reference line.

Specifically, in the process of displaying the target video, the electronic device may display, in the first video picture area of the target video, the target video text in alignment with the first area boundary of the first video picture area, which is far away from the first preset reference line.

In an embodiment of the present disclosure, in the case where the target video text is located in the first video picture area, the target video text may be displayed in alignment with the first area boundary of the first video picture area, which is far away from the first preset reference line, so that the first area boundary forms a text-fixed axis of the target video text in the first video picture area.

Specifically, displaying the target video text in alignment with the first area boundary of the first video picture area that is far away from the first preset reference line may mean that the text of the target video text on a side facing the first area boundary (for example, a row of text facing the first area boundary or a column of text facing the first area boundary) is displayed in alignment at a display position adjacent to the first area boundary (for example, a row display position or a column display position adjacent to the first area boundary), so as to ensure that the text of the target video text on a side facing the first area boundary is always displayed close to the first area boundary.

Taking the target video text being subtitles as an example, since the length of each subtitle is different, displaying the target video text in alignment with the text-fixed axis can ensure that the subtitles will not overflow the screen or be cut off due to a change of the length.

Figure 3:
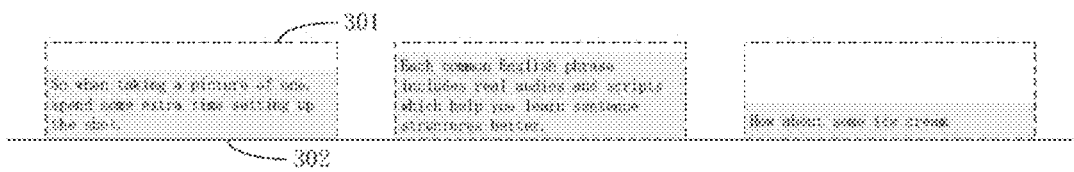
FIG. 3 is a schematic diagram of a text-fixed axis provided by an embodiment of the present disclosure.

Next, a display mode to align to the text-fixed axis provided by an embodiment of the present disclosure is described by taking FIG. 3 as an example.

FIG. 3 shows a schematic diagram of a text-fixed axis provided by an embodiment of the present disclosure. As shown in FIG. 3, a first video picture area 301 may be located in a lower half display area of the first target interface, and a bottom area boundary 302 of the first video picture area 301 may serve as a first area boundary, i.e., the bottom area boundary 302 of the first video picture area 301 may form a text-fixed axis of the target video text in the first video picture area 301. In the case where the target video text is displayed in the first video picture area 301, the last line of text of the target video text is always displayed near (closely attached to) the bottom area boundary 302 of the first video picture area 301.

In some embodiments, the area size of the first video picture area may be adjusted and determined in accordance with the text size of the target video text by using the first area boundary as an area fixed axis, i.e., the area size of the first video picture area may be increased toward a direction opposite to the first area boundary (toward the direction of the first preset reference line) by using the first area boundary as the area fixed axis, and the area size of the second video picture area may be adjusted and determined in accordance with the text size of the target video text by using the second area boundary as the area fixed axis, i.e., the area size of the second video picture area may be increased toward a direction opposite to the second area boundary (toward the direction of the second preset reference line) by using the second area boundary as the area fixed axis.

In other embodiments, the first video picture area and the second video picture area may have fixed and same area sizes that are preset as needed.

Figure 4:
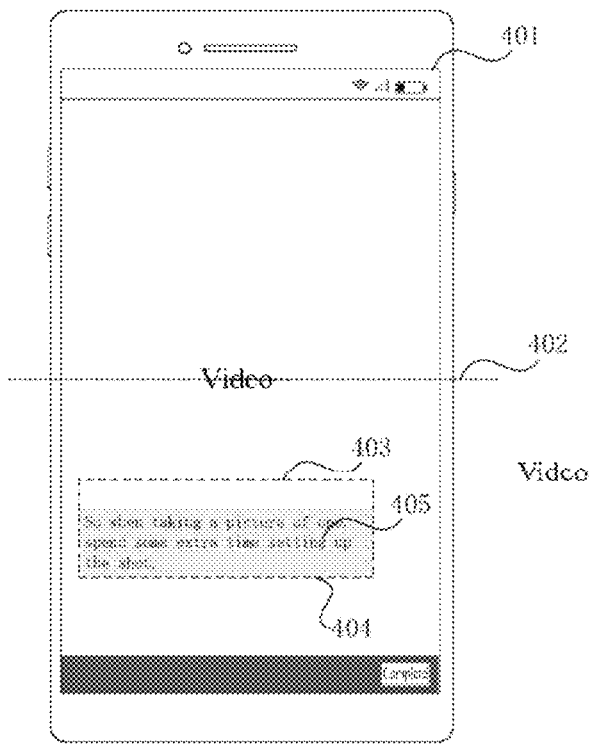
FIG. 4 is a schematic diagram of a video editing interface provided by an embodiment of the present disclosure.

Next, take FIG. 4 as an example to describe a display mode of a target video text in a video editing interface provided by an embodiment of the present disclosure.

FIG. 4 shows a schematic diagram of a video editing interface provided by an embodiment of the present disclosure. As shown in FIG. 4, an electronic device displays a target video in a video editing page 401. A horizontal center line 402 of the video editing page 401 may serve as a first preset reference line. A first video picture area 403 may be located below the horizontal center line 402, i.e., the first video picture area 403 may be located in a lower half display area obtained by dividing the display screen by the horizontal center line 402, and a bottom area boundary 404 of the first video picture area 403 is an area boundary far from the horizontal center line 402, therefore, the bottom area boundary 404 of the first video picture area 403 may be used as a first area boundary of the first video picture area 403, i.e., the bottom area boundary 404 of the first video picture area 403 may be used as a text-fixed axis of the target video text 405 in the first video picture area 403. The target video text 405 may be displayed in the first video picture area 403, and the target video text 405 may be displayed in alignment with the bottom area boundary 404 of the first video picture area 403, so as to ensure that the target video text 405 will not overflow the screen or be cut off due to a change in length, thereby further improving the video viewing experience of the user.

In some embodiments, when the size of the target video text changes (e.g., the number of words or font size changes), the electronic device may adjust the size of the first video picture area by using the bottom area boundary 404 of the first video picture area 403 as an area fixed axis.

In some embodiments, if the user completes editing of the target video, a video publishing operation may be input to the target video, such as clicking a completion button shown in FIG. 4, so that the electronic device publishes the target video.

Returning to FIG. 2, further, the moving the target video text from the first video picture area to the second video picture area for display in S230 may specifically include:

moving the target video text from the first video picture area to the second video picture area;

in the second video picture area, displaying the target video text in alignment with a second area boundary of the second video picture area, the second area boundary being an area boundary of the second video picture area that is far away from the first preset reference line.

Specifically, when the electronic device detects a moving operation on the target video text, if it is determined that the moving operation is used for moving the target video text to a second video picture area of the target video, the target video text may be moved from the first video picture area to the second video picture area, and in the second video picture area, the target video text is displayed in alignment with a second area boundary of the second video picture area, which is far away from the first preset reference line.

In an embodiment of the present disclosure, in the case where the target video text is located in the second video picture area, the target video text may be displayed in alignment with a second area boundary of the second video picture area, which is far away from the first preset reference line, such that the second area boundary forms a text-fixed axis of the target video text in the second video picture area, which is not described herein again.

Figure 5:
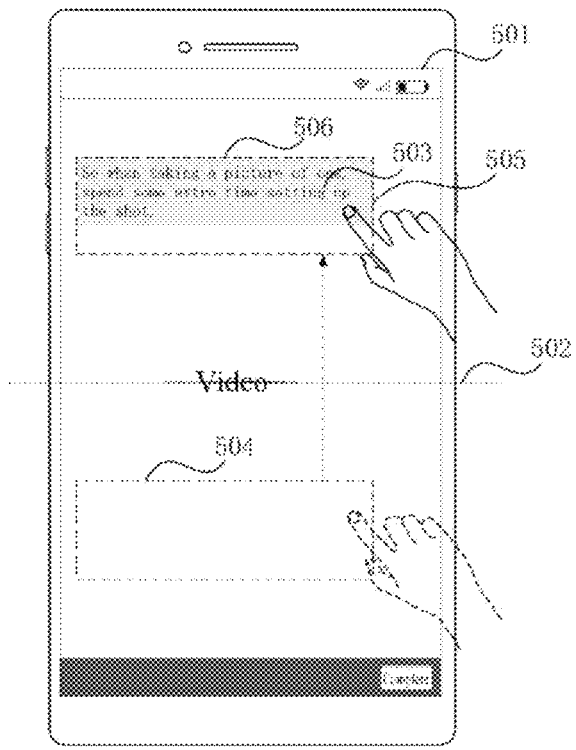
FIG. 5 is a schematic diagram of a moving operation process provided by an embodiment of the present disclosure.

Next, a moving operation process provided by an embodiment of the present disclosure is described by taking FIG. 5 as an example.

FIG. 5 shows a schematic diagram of a moving operation process provided by an embodiment of the present disclosure.

As shown in FIG. 5, an electronic device displays a target video in a video editing interface 501. A horizontal center line 502 of the video editing interface 501 may be a first preset reference line. Target video text 503 may be displayed in a first video picture area 504, and the first video picture area 504 may be located below the horizontal center line 502, i.e., the first video picture area 504 may be located in a lower half display area obtained by dividing the display screen by the horizontal center line 502. If the user wants to change the display position of the target video text to a second video picture area 505, the target video text 503 may be dragged from the first video picture area 504 to the second video picture area 505. The second video picture area 505 may be located above the horizontal center line 502, i.e., the second video picture area 505 may be located in an upper half display area obtained by dividing the display screen by the horizontal center line 502, and a top area boundary 506 of the second video picture area 505 is an area boundary far from the horizontal center line 502, therefore, the top area boundary 506 of the second video picture area 505 may be used as a second area boundary of the second video picture area 505, i.e., the top area boundary 506 of the second video picture area 505 may be used as a text-fixed axis of the target video text 503 in the second video picture area 505. In the case where the target video text 503 is dragged to be able to be displayed in the second video picture area 505, the target video text 503 may be displayed in alignment with the top area boundary 506 of the second video picture area 505, so as to ensure that the target video text 503 will not overflow the screen or be cut off due to a change in length, thereby further improving the video viewing experience of the user.

In some embodiments, when the size of the target video text changes (e.g., the number of words or font size changes), the electronic device may adjust the size of the second video picture area by using the top area boundary 506 of the second video picture area 505 as the area fixed axis.

In an embodiment of the present disclosure, the first target interface may further have a first interface boundary line and a second interface boundary line, and the first interface boundary line and the second interface boundary line may be respectively located on two sides of the first preset reference line. The area position of the first video picture area may be determined based on the first interface boundary line, and the area position of the second video picture area may be determined based on the second interface boundary line.

The first target interface may further have a first interface boundary line and a second interface boundary line which are preset and located on two sides of the first preset reference line, respectively, so that the area position of the first video picture area in the first target interface may be determined according to the first interface boundary line, and the area position of the second video picture area in the first target interface may be determined according to the second interface boundary line.

For example, a first area boundary of the first video picture area may coincide with the first interface boundary line to determine the area position of the first video picture area, and a second area boundary of the second video picture area may coincide with the second interface boundary line to determine the area position of the second video picture area.

Specifically, in order to avoid that the position of the moved target video text is different from the general viewing habit of the user, a first interface boundary line and a second interface boundary line may be preset on the first target interface of the electronic device, the first interface boundary line and the second interface boundary line may be respectively located on two sides of a first preset reference line, the first interface boundary line is provided on the same side as the first video picture area, and the second interface boundary line is provided on the same side as the second video picture area. Thus, the first interface boundary line can be used as the position of the first area boundary of the first video picture area and the second interface boundary line can be used as the position of the second area boundary of the second video picture area, thereby determining the area position of the first video picture area and the area position of the second video picture area.

It should be noted that the first interface boundary line and the second interface boundary line may be preset according to needs, and are not limited herein.

Taking the first preset reference line as a horizontal center line of the first target interface as an example, the first interface boundary line may be a bottom boundary line of the first target interface, and the second interface boundary line may be a top boundary line of the first target interface. Taking the first preset reference line as a vertical center line of the first target interface as an example, the first interface boundary line may be a left boundary line of the first target interface, and the second interface boundary line may be a right boundary line of the first target interface.

Figure 6:
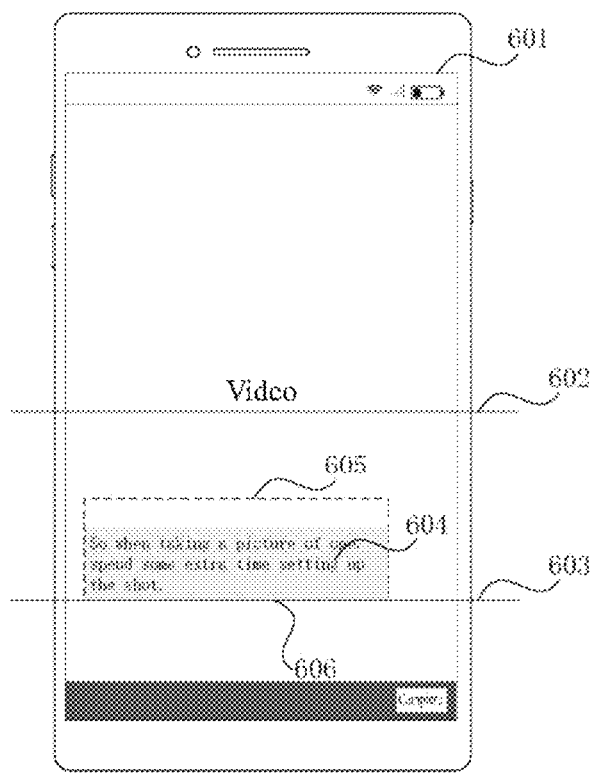
FIG. 6 is a schematic diagram of another video editing interface provided by an embodiment of the present disclosure.

FIG. 6 shows a schematic diagram of another video editing interface provided by an embodiment of the present disclosure.

As shown in FIG. 6, an electronic device displays a target video in a video editing interface 601. A horizontal center line 602 of the video editing interface 601 may be a first preset reference line, a bottom boundary line 603 may be disposed below the horizontal center line 602, and the bottom boundary line 603 may be a first interface boundary line of the video editing interface 601. A target video text 604 may be displayed in a first video picture area 605, the first video picture area 605 may be located in a lower half display area obtained by dividing the display screen by the horizontal center line 602, and a bottom area boundary 606 of the first video picture area 605 far from the horizontal center line 602 may coincide with the bottom boundary 603, so as to ensure that the arrangement position of the target video text 604 conforms to the general viewing habit of a user, and further improve a video viewing experience of the user.

Figure 7:
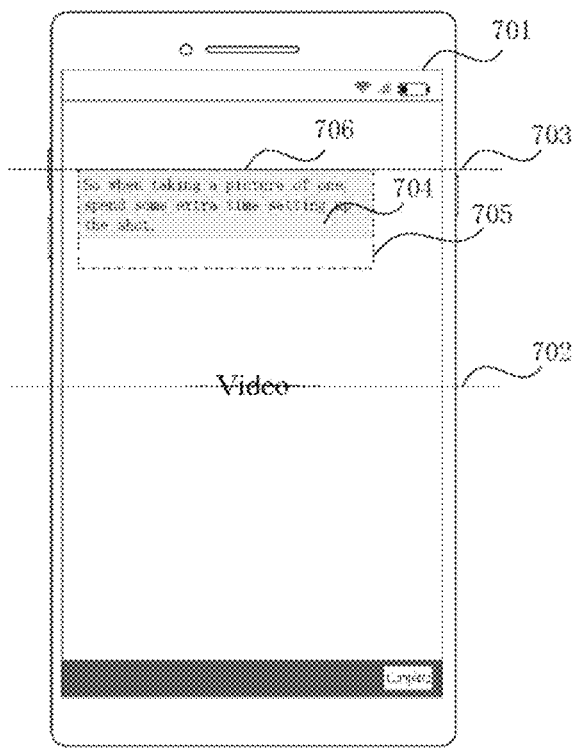
FIG. 7 is a schematic diagram of yet another video editing interface provided by an embodiment of the present disclosure.

FIG. 7 shows a schematic diagram of yet another video editing interface provided by an embodiment of the present disclosure.

As shown in FIG. 7, an electronic device displays a target video in a video editing interface 701. A horizontal center line 702 of the video editing interface 701 may be a first preset reference line, a top boundary line 703 may be disposed below the horizontal center line 702, and the top boundary line 703 may be a second interface boundary line of the video editing interface 701. When a target video text 704 is moved into a second video picture area 705 for display, the second video picture area 705 may be located in an upper half display area obtained by dividing the display screen by the horizontal center line 702, and a top area boundary 706 of the second video picture area 705 far from the horizontal center line 702 may coincide with the top boundary line 703, so as to ensure that the arrangement position of the target video text 704 conforms to the general viewing habit of a user, and further improve the video viewing experience of the user.

In an embodiment of the present disclosure, the target video text may also be displayed in a video text box, so that the target video text is wrapped in the video text box.

In the case where the target video text includes subtitles, the video text box can be a subtitle box; in the case where the target video text includes bullet screens, the video text box can be a bullet screen box.

In some embodiments, the video text box may comprise a virtual text box container. In other embodiments, the video text box may comprise an entity text box container. The video picture of the target video can be overlaid with a video text box, and the target video text can be displayed in the video text box. At this time, the video text box may be displayed as a text box having any color, and may also be displayed as a transparent text box, which is not limited herein.

Specifically, when the target video text is displayed in the first video picture area, the video text box may be located in the first video picture area, and the size of the video text box may be smaller than or equal to that of the first video picture area, and when the target video text is displayed in the second video picture area, the video text box may be located in the second video picture area, and the size of the video text box may be smaller than or equal to that of the second video picture area.

When the target video text is displayed in the first video picture area, the alignment border of the video text box can comprise a first border of the video text box close to the first area boundary, and the target video text can be displayed in alignment with the first border; when the target video text is displayed in the second video picture area, the alignment border of the video text box may include a second border of the video text box close to the second area boundary, and the target video text may be displayed in alignment with the second border.

Specifically, when the target video text is located in the first video picture area, because the first area boundary is a text-fixed axis of the target video text, and the first border is close to the first area boundary, the first border may be further used as an alignment border of the target video text, i.e., a text-fixed axis of the target video text, so that the target video text may be displayed in alignment with the first border; when the target video text is located in the second video picture area, because the second area boundary is a text-fixed axis of the target video text, and the second border is close to the second area boundary, the second border can be further used as an alignment border of the target video text, i.e., a text-fixed axis of the target video text, so that the target video text can be displayed in alignment with the second border.

In some embodiments, in the case where the target video text is displayed in the video text box, when the moving operation on the target video text is detected, the video editing method may further include:
  detecting the real-time position of a target border of the video text box during the movement of the target video text, wherein the target border comprises at least one of a first border and a second border;
  determining an alignment border of the target video text in the first border and the second border according to the relative position between the real-time position and the first preset reference line;
  displaying the target video text in alignment with the alignment border.

Specifically, the electronic device can synchronously move the video text box during the movement of the target video text, and can detect the real-time position of at least one of the first border and the second border of the video text box in real time, and determine the relative position between the real-time position and the preset reference line, thereby determining the alignment border of the target video text in the first border and the second border according to the relative position between the real-time position and the first preset reference line, and displaying the target video text in alignment with the alignment border.

Taking real-time detection of the real-time position of the second border during the movement of the target video text as an example, if the relative position between the real-time position of the second border and the first preset reference line is that the second border and the first video picture area are located on the same side, i.e., the second border does not pass through the first preset reference line, the first border is kept as an alignment border of the target video text, and then the target video text is aligned with the first border for display, and if the relative position between the real-time position of the second border and the first preset reference line is that the second border and the second video picture area are located on the same side, i.e., the second border passes through the first preset reference line, the second border is used as an alignment border of the target video text, and then the target video text is aligned with the second border for display, so as to realize position conversion of the text-fixed axis. It should be noted that the method for determining the alignment border according to the real-time position of the first border is similar to the above method, and is not described herein again. In addition, in one embodiment, the target border may also be adjusted according to the direction of the moving operation, for example, when the direction of the moving operation is from the first video picture area to the second video picture area, one border of the first border and the second border may be determined as the target border; when the direction of the moving operation is from the second video picture area to the first video picture area, the other border of the first border and the second border may be determined as the target border. The target border can be determined according to the actual application requirement in the present disclosure.

Specifically, when the direction of the moving operation is from the first video picture area to the second video picture area, the second border may be determined as the target border; when the direction of the moving operation is from the second video picture area to the first video picture area, the first border may be determined as the target border.

A moving operation process provided by an embodiment of the present disclosure is described below by taking FIG. 8 and FIG. 9 as an example.

Figure 8:
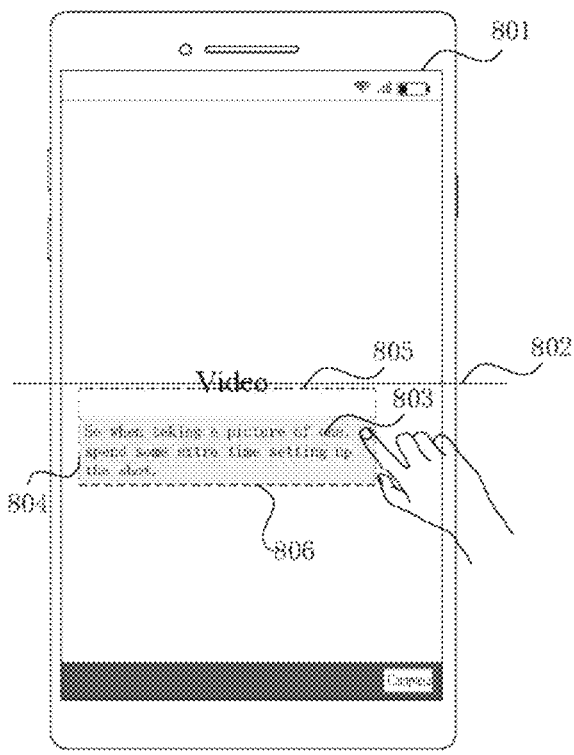
FIG. 8 is a schematic diagram of another moving operation process provided by an embodiment of the present disclosure.

FIG. 8 shows a schematic diagram of another moving operation process provided by an embodiment of the disclosure.

As shown in FIG. 8, an electronic device displays a target video in a video editing interface 801. A horizontal center line 802 of a video editing interface 801 may be a first preset reference line. Target video text 803 is displayed in a video text box 804. If the first video picture area is located below the horizontal center line 802 and the second video picture area is located above the horizontal centerline 802, the area boundary of the first video picture area far away from the horizontal center line 802 is a bottom area boundary and the area boundary of the second video picture area far away from the horizontal center line 802 is a top area boundary, so a top border 805 of the video text box 804 is the second border and a bottom border 806 of the video text box 804 is the first border. As the user drags the target video text 803, the video text box 804 moves synchronously with the target video text 803, and as the top border 805 of the video text box 804 moves below the horizontal center line 802, the bottom border 806 of the video text box 804 is determined to be an alignment border and the target video text 803 is always displayed in alignment with the bottom border 806 of the video text box 804.

Figure 9:
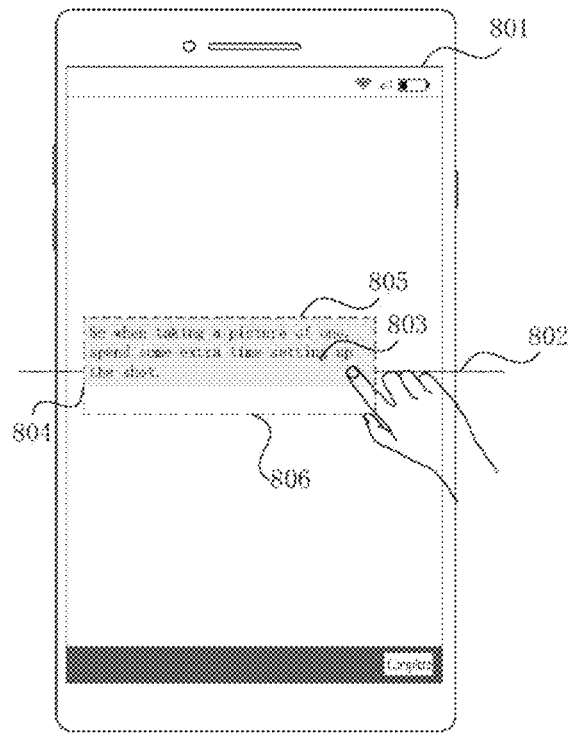
FIG. 9 is a schematic diagram of yet another moving operation process provided by an embodiment of the present disclosure.

FIG. 9 shows a schematic diagram of yet another moving operation process provided by an embodiment of the present disclosure.

As shown in FIG. 9, an electronic device displays a target video in a video editing interface 801. A horizontal center line 802 of the video editing interface 801 may be a first preset reference line. Target video text 803 is displayed in a video text box 804. If the first video picture area is located below the horizontal center line 802 and the second video picture area is located above the horizontal centerline 802, the area boundary of the first video picture area far away from the horizontal center line 802 is a bottom area boundary and the area boundary of the second video picture area far away from the horizontal center line 802 is a top area boundary, so a top border 805 of the video text box 804 is the second border and a bottom border 806 of the video text box 804 is the first border. As the user drags the target video text 803, the video text box 804 moves synchronously with the target video text 803, and as the top border 805 of the video text box 804 passes through the horizontal center line 802 and moves above the horizontal center line 802, the top border 805 of the video text box 804 is determined to be an alignment border and the target video text 803 is always displayed in alignment with the top border 805 of the video text box 804.

In some embodiments, before determining, in the first border and the second border, an alignment border of the target video text according to the relative position between the real-time position and the first preset reference line, the video editing method may further include:

detecting the real-time moving direction of the target video text during the movement of the target video text.

Accordingly, determining the alignment border of the target video text in the first border and the second border according to the relative position between the real-time position and the first preset reference line may specifically include:

determining the alignment border in the first border and the second border according to the relative position between the real-time position and the preset reference line and the real-time moving direction.

Taking detecting the real-time position of the first border and the real-time position of the second border in real time during the movement of the target video text as an example, the electronic device may move the video text box synchronously during the movement of the target video text, and may detect the real-time position of the first border and the real-time position of the second border of the video text box and the real-time moving direction of the target video text in real time, and determine the relative position between the real-time position of the first border and the first preset reference line and the relative position between the real-time position of the second border and the first preset reference line. If the real-time moving direction is from the first video picture area to the second video picture area and the relative position between the real-time position of the second border and the first preset reference line is that the second border and the first video picture area are on the same side, namely the second border does not pass through the first preset reference line, the first border is kept as the alignment border of the target video text, then the target video text is aligned with the first border for display; if the real-time moving direction is from the first video picture area to the second video picture area and the relative position between the real-time position of the second border and the preset reference line is that the second border and the second video picture area are on the same side, namely the second border passes through the first preset reference line, the second border is taken as the alignment border of the target video text, and then the target video text is aligned with the second border for display, so that position conversion of the text-fixed axis is realized; if the real-time moving direction is from the second video picture area to the first video picture area and the relative position between the real-time position of the first border and the preset reference line is that the first border and the second video picture area are on the same side, namely the first border does not pass through the first preset reference line, the second border is kept as the alignment border of the target video text, and the target video text and the second border are aligned for display; if the real-time moving direction is from the second video picture area to the first video picture area and the relative position between the real-time position of the first border and the preset reference line is that the first border and the first video picture area are on the same side, namely the first border passes through the first preset reference line, the first border is taken as the alignment border of the target video text, and then the target video text is aligned with the first border for display, so that the position conversion of the text-fixed axis is realized.

In some embodiments of the present disclosure, the video editing method may further include:

adjusting the size of the text box of the video text box by taking the alignment border as a text box fixed axis according to the text size of the target video text.

Specifically, the text box size of the video text box can be adjusted and determined by taking the alignment border as the text box fixed axis according to the text size of the target video text, i.e., the area height in the area size of the video text box is made to increase in the opposite direction of the alignment border by taking the alignment border as the text box fixed axis, thereby adjusting the text box size of the video text box.

In other embodiments, the video text box may have a fixed text box size that is preset as needed.

In another embodiment of the present disclosure, to further enhance the video viewing experience of the user, when the moving operation on the target video text is detected, the video editing method may further include:

changing a transparency of the target video text from a first transparency to a second transparency during the movement of the target video text;

wherein the first transparency is a transparency before the target video text is moved, and the second transparency is larger than the first transparency.

Specifically, the electronic device may change the transparency of the target video text from the first transparency to the second transparency during the movement of the target video text, so as to avoid excessive occlusion of the video content by the target video text.

In an embodiment of the present disclosure, the first transparency and the second transparency may be any transparencies preset as needed, and are not limited herein.

For example, the first transparency may be 0, and the second transparency may be 50%, so that the target video text may be changed from opaque to semi-transparent during the movement of the target video text, thereby avoiding excessive occlusion of the video content by the target video text.

Figure 10:
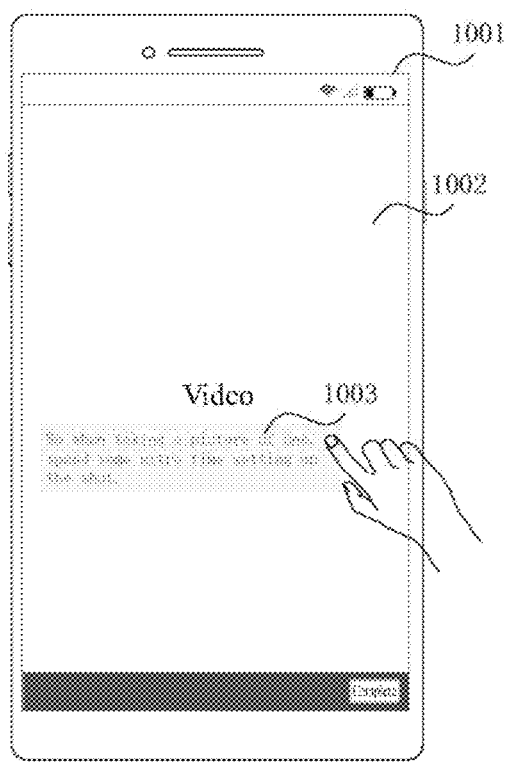
FIG. 10 is a schematic diagram of a further moving operation process provided by an embodiment of the present disclosure.

Next, a moving operation process provided by an embodiment of the present disclosure is described by taking FIG. 10 as an example.

FIG. 10 shows a schematic diagram of a further moving operation process provided by an embodiment of the present disclosure.

As shown in FIG. 10, an electronic device displays a target video 1002 in a video editing interface 1001. The target video 1002 is overlaid with the target video text 1003 for display, and in the process that the user drags the target video text 1003, the target video text 1003 is changed from opaque (as shown in FIG. 4) to semi-transparent, thereby avoiding excessive occlusion of the video content by the target video text 1003.

In summary, the video editing method provided by an embodiment of the present disclosure can provide a video author with a function of adjusting the position of a plug-in video text, such as plug-in subtitles, and let the video author ensure that the plug-in video text can be displayed completely, thereby improving the experience and feeling of a video viewer when watching a video.

The following continues to describe a video playing method provided by an embodiment of the present disclosure with reference to FIG. 11 to FIG. 16. In an embodiment of the present disclosure, the video playing method may be performed by an electronic device, for example, the video playing method may be performed by the second electronic device 102 in the client side illustrated in FIG. 1. The electronic device may include a mobile phone, a tablet computer, a desktop computer, a notebook computer, a vehicle-mounted terminal, a wearable electronic device, an all-in-one machine, a smart home device and other devices with communication functions, and may also include a virtual machine or a simulator-simulated device.

Figure 11:
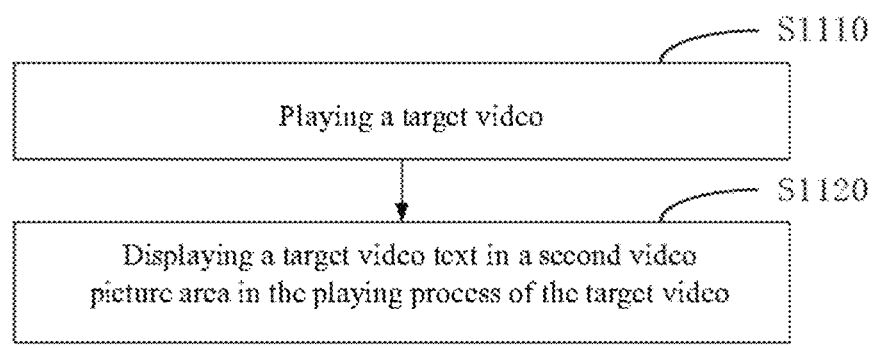
FIG. 11 is a schematic flow diagram of a video playing method provided by an embodiment of the present disclosure.

FIG. 11 shows a schematic flow diagram of a video playing method provided by an embodiment of the present disclosure.

As shown in FIG. 11, the video playing method may include the following steps.

S1110, playing a target video.

In an embodiment of the present disclosure, an electronic device may display a target video to be played, and play the target video.

In some embodiments, S1110 may specifically include playing the target video in a second target interface.

Where the second target interface can be any video interface. For example, the second target interface may be a video play interface.

S1120, in the playing process of the target video, displaying a target video text in a second video picture area.

In an embodiment of the disclosure, before the target video is played, the electronic device may acquire a display position of the target video text in the video data to which the target video belongs, and then in a process of playing the target video, in the case where the display position of the target video text is a second video picture area of the target video, overlap and display the target video text on a video picture of the target video in the second video picture area of the target video.

In an embodiment of the present disclosure, the second video picture area may be a video picture area to which the target video text is moved from a first video picture area, which is determined in the process of video editing of the target video.

Specifically, in the process of video editing of the target video by a video author, the target video text may be moved from a first video picture area of the target video to a second video picture area of the target video for display, so that a display position of the target video is updated from the first video picture area to the second video picture area, and after the video author completes production of the video and releases the video, the display position of the target video text in the video data to which the target video belongs becomes the second video picture area. Therefore, when a video viewer watches a video by using the electronic device, before the target video is played, the electronic device may acquire the display position of the target video text in the video data to which the target video belongs, and then, in the process of playing the target video, when the display position of the target video text is in the second video picture area, the target video text is displayed in the second video picture area of the target video.

In the embodiment of the present disclosure, the display position of the target video text, the first video picture area, the second video picture area, and the target video text are similar to those of the embodiment of the video editing method, and are not described herein again.

In an embodiment of the present disclosure, after S1120, the video playing method may further include: when a text hiding operation on the target video text is detected, performing hide display on the target video text.

Specifically, if the electronic device detects a text hiding operation on the target video text such as clicking, long-pressing, double-clicking and the like on the target video text or other operations for triggering the hiding of the target video text in the process of playing the target video, hide display can be performed on the target video text, and if the electronic device detects a text display operation on the target video text such as clicking, long-pressing, double-clicking and the like on the second video picture area or other operations for triggering the resuming of the display of the target video text in the process of playing the target video in the condition of performing hide display on the target video text, the target video text can be resumed to be displayed in the second video picture area, so that a user can decide whether to display the target video text.

In an embodiment of the present disclosure, after S1120, the video playing method may further include: when a text translation operation on the target video text is detected, a translation text corresponding to the target video text can be displayed.

Specifically, if the electronic device detects a text translation operation on the target video text, such as clicking, long-pressing, double-clicking, or other operations for triggering display of the translation text corresponding to the target video text, in the process of playing the target video, the translation text corresponding to the target video text may be displayed in the second video picture area, for example, the target video text is replaced by the translation text for display, so that the target video text may be translated.

In an embodiment of the present disclosure, the electronic device may display the target video text based on the adjusted display position of the target video text, for example, if the main content of the video is in the first video picture area, the target video text may be displayed in the second video picture area to prevent the target video text from blocking the main content of the video, so that the video viewing experience of the user is improved.

In another embodiment of the present disclosure, to further improve the video viewing experience of the user, the area positions of the first video picture area and the second video picture area within the second target interface and the display mode of the target video text in the first video picture area and the second video picture area may be designed.

In some embodiments of the present disclosure, in the case where the target video is played in the second target interface, the second target interface may further have a second preset reference line, wherein the relative positions between the first video picture area and the second preset reference line and between the second video picture area and the second preset reference line may be located on two sides of the second preset reference line, respectively.

In some embodiments, the first video picture area and the second video picture area may be located on two sides of the second preset reference line, respectively.

The second preset reference line is similar to the first preset reference line in the above video editing method embodiment, and the arrangement manner of the first video picture area and the second video picture area relative to the second preset reference line is similar to the arrangement manner relative to the first preset reference line in the above video editing method embodiment, which is not described herein again.

In other embodiments, most areas of the first video picture area are located on a first side of the second preset reference line, and most areas of the second video picture area are located on a second side of the second preset reference line, so that the relative positions between the first video picture area and the second preset reference line and between the second video picture area and the second preset reference line can be respectively located on two sides of the second preset reference line, which is similar to the arrangement manner of the first video picture area and the second video picture area relative to the first preset reference line in the above video editing method embodiment, and is not repeated herein.

In an embodiment of the present disclosure, S1120 may specifically include:

in the second video picture area, displaying a target video text in alignment with a second area boundary of the second video picture area, the second area boundary being an area boundary of the second video picture area far away from the second preset reference line.

Specifically, the electronic device may align the target video text in the second video picture area to the second area boundary of the second video picture area far from the second preset reference line for display, so that the second area boundary forms a text-fixed axis of the target video text in the second video picture area, which is similar to the video editing method embodiment and is not described herein again.

Therefore, in the embodiment of the disclosure, the target video text can be ensured to be completely displayed, and will not be cropped due to different screen sizes, and will not overflow the screen or be cut off due to a change in length.

Figure 12:
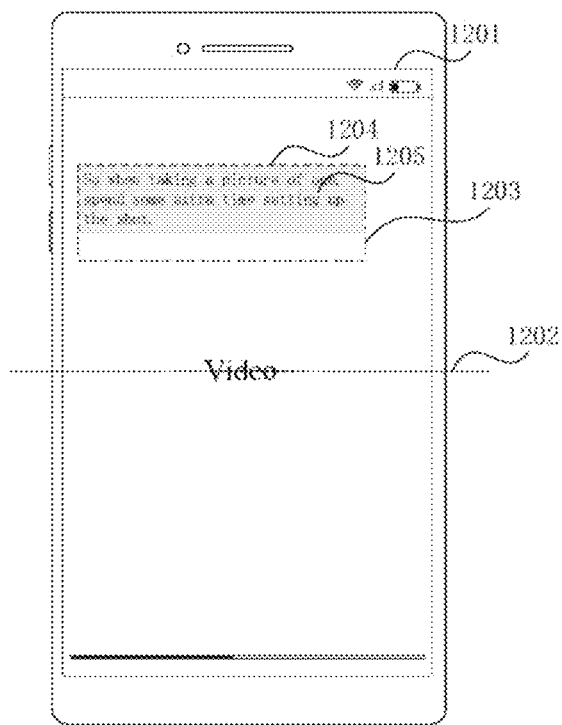
FIG. 12 is a schematic diagram of a video play interface provided by an embodiment of the present disclosure.

Next, a video play interface provided by an embodiment of the present disclosure is described by taking FIG. 12 as an example.

FIG. 12 shows a schematic diagram of a video play interface provided by an embodiment of the present disclosure.

As shown in FIG. 12, the electronic device may display the video play interface, and a target video may be played in the video play interface 1201. A horizontal center line 1202 of the video play interface 1201 may be a second preset reference line. A second video picture area 1203 may be located above the horizontal center line 1202, i.e., the second video picture area 1203 may be located in an upper half display area obtained by dividing the display screen by the horizontal center line 1202, and a top area boundary 1204 of the second video picture area 1203 is an area boundary far from the horizontal center line 1202, therefore, the top area boundary 1204 of the second video picture area 1203 may be used as a second area boundary of the second video picture area 1203, i.e., the top area boundary 1204 of the second video picture area 1203 may be used as a text-fixed axis of a target video text 1205 in the second video picture area 1203. The target video text 1205 may be displayed in the second video picture area 1203, and the target video text 1205 may be displayed in alignment with the top area boundary 1204 of the second video picture area 1203, so as to ensure that the target video text 1205 will not overflow the screen or be cut off due to a change in length, thereby further improving the video viewing experience of the user.

In an embodiment of the present disclosure, the second target interface may further have a third interface boundary line and a fourth interface boundary line, and the third interface boundary line and the fourth interface boundary line may be respectively located on two sides of the second preset reference line. The third interface boundary line and the second video picture area may be located on the same side of the second preset reference line, and the fourth interface boundary line and the first video picture area may be located on the same side of the second preset reference line.

Further, in the case where the third interface boundary line is located in a non-interface element display area of the target video, an area position of the second video picture area may be determined according to the third interface boundary line, and in the case where the third interface boundary line is located in an interface element display area of the target video, the area position of the second video picture area may be determined according to a target boundary line corresponding to the third interface boundary line, and the target boundary line may be located in the non-interface element display area.

The interface element display area may be an area displaying interface elements, and the non-interface element display area may be an area not displaying interface elements. The interface elements may include interface controls, interface icons and other elements in the video play interface that are superimposed and displayed on the video picture of the target vide.

Specifically, in order to avoid that the target video text is blocked by the interface element, the electronic device may first determine whether the third interface boundary line is located in the non-interface element display area, if so, directly coincide the second area boundary of the second video picture area with the third interface boundary to determine the area position of the second video picture area in the second target interface, and then display the target video text in the second video picture area, and if not, determine the target boundary line corresponding to the third interface boundary line in the non-interface element display area, and then coincide the second area boundary of the second video picture area with the target boundary line to determine the area position of the second video picture area in the second target interface, and then display the target video text in the second video picture area.

Further, the electronic device may set in advance a preset distance as needed, and in the non-interface element display area, a reference line that is the preset distance from an area boundary of the non-interface element display area, which is close to the third interface boundary line, is taken as a target boundary line corresponding to the third interface boundary line.

Taking the second video picture area located in the upper half display area of the second target interface as an example, the third interface boundary line is a top interface boundary line, a reference line having the preset distance from the top area boundary of the non-interface element display area may be selected in the non-interface element display area as a target boundary line.

Therefore, in the embodiment of the present disclosure, the target video text can be finely adjusted according to the interface elements, so as to ensure that the subtitles are not covered or shielded by other interface elements.

Figure 13:
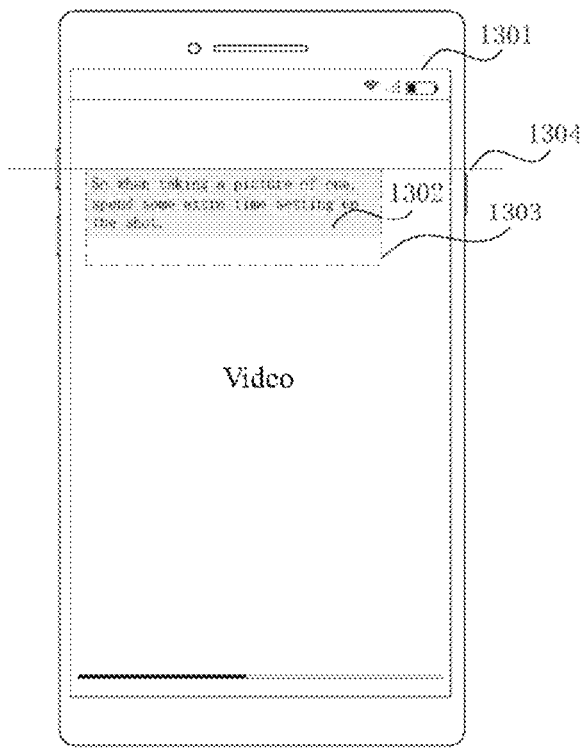
FIG. 13 is a schematic diagram of another video play interface provided by an embodiment of the present disclosure.
Figure 14:
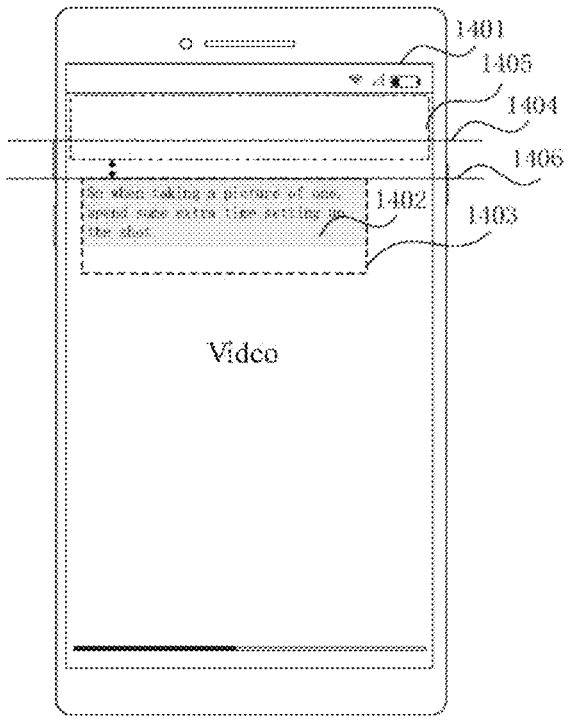
FIG. 14 is a schematic diagram of yet another video play interface provided by an embodiment of the present disclosure.

Next, a video play interface provided by an embodiment of the present disclosure is described by taking FIG. 13 and FIG. 14 as an example.

FIG. 13 shows a schematic diagram of another video play interface provided by an embodiment of the present disclosure.

As shown in FIG. 13, an electronic device may display a video play interface 1301, and a target video may be played in the video play interface 1301. Target video text 1302 may be located in a second video picture area 1303. A top boundary line 1304 of the video play interface 1301 may be a third interface boundary line. When the top boundary line 1304 is not in the interface element display area, the top area boundary of the second video picture area 1303 may coincide with the top boundary line 1304 to determine the area position of the second video picture area 1303.

FIG. 14 shows a schematic diagram of yet another video play interface provided by an embodiment of the present disclosure.

As shown in FIG. 14, an electronic device may display a video play interface 1401, and a target video may be played in the video play interface 1401. Target video text 1402 may be located in a second video picture area 1403. A top boundary line 1404 of the video play interface 1401 may be a third interface boundary line. When the top boundary line 1404 is in the interface element display area 1405, it is necessary to determine a reference line 1406 having a preset distance from the top area boundary of the non-interface element display area in the non-interface element display area, and to coincide the top area boundary of the second video picture area 1403 with the reference line 1406, so that the target video text 1402 is not occluded by other interface elements overlaid on the video.

In an embodiment of the present disclosure, the target video text may also be displayed in a video text box, so that the target video text is wrapped in the video text box, which is not described herein again.

In yet another embodiment of the present disclosure, in order to further enhance the video viewing experience of the user, the target video text may also automatically avoid the target object in the target video.

In an embodiment of the present disclosure, the target video may include a plurality of video image frames.

Accordingly, before S1120, the video playing method may further include:

performing target object detection on an image picture of each video image frame in the second video picture area respectively to obtain an object detection result of each video image frame.

Accordingly, S1120 may specifically include:

in the case where the object detection result indicates that no target object exists, displaying a target video text corresponding to the video image frame to which the object detection result belongs in the second video picture area.

Further, after the object detection result of each video image frame is obtained by performing target object detection on the image picture of each video image frame in the second video picture area respectively, the video playing method may further include:

in the case where the object detection result indicates that the target object exists, displaying a target video text corresponding to the video image frame to which the object detection result belongs in the first video picture area.

Specifically, in the case where the display position of the target video text is determined to be the second video picture area of the target video, before each video image frame is played, the electronic device may further perform target object detection on the image picture of each video image frame in the second video picture area respectively to obtain an object detection result of each video image frame, and further, for each video image frame, if the object detection result corresponding to the video image frame is that no target object exists, the target video text corresponding to the video image frame is displayed in the second video picture area, and if the object detection result corresponding to the video image frame is that a target object exists, the target video text corresponding to the video image frame is displayed in the first video picture area.

Next, a video playing method provided by the present embodiment will be described with reference to FIG. 15.

Figure 15:
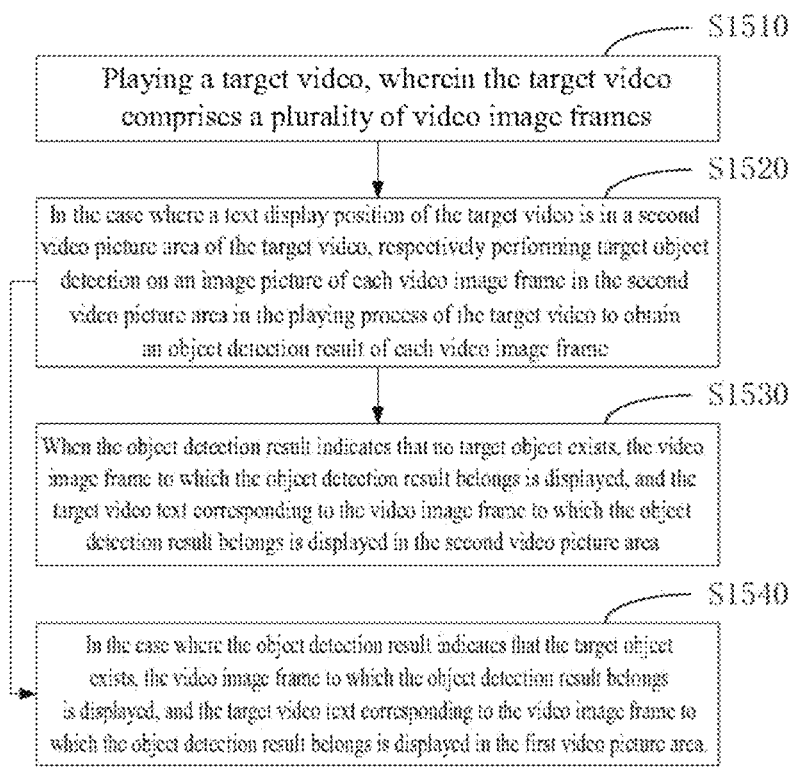
FIG. 15 is a schematic flow diagram of another video playing method provided by an embodiment of the present disclosure.

FIG. 15 shows a schematic flow diagram of another video playing method provided by an embodiment of the present disclosure.

As shown in FIG. 15, the video playing method may include the following steps.

S1510, playing a target video, wherein the target video comprises a plurality of video image frames.

In an embodiment of the present disclosure, the electronic device may display a target video to be played, and play the target video.

In some embodiments, the electronic device may play the target video in the second target interface.

Further, the target video may include a plurality of video image frames, and playing the target video is to sequentially display each video image frame according to a frame sequence of the plurality of video image frames.

S1520, in the case where a text display position of the target video is in a second video picture area of the target video, respectively performing target object detection on an image picture of each video image frame in the second video picture area in the playing process of the target video to obtain an object detection result of each video image frame.

In an embodiment of the present disclosure, in the playing process of the target video, the target video text is displayed in the second video picture area of the target video.

In the embodiment of the present disclosure, the display position of the target video text, the first video picture area, the second video picture area, and the target video text are all described above and are not described herein again.

In an embodiment of the disclosure, before playing the target video, the electronic device may acquire a display position of the target video text in the video data to which the target video belongs, and then, in the process of playing the target video, in the case where the display position of the target video text is a second video picture area of the target video, target object detection is respectively performed on the image picture of the video image frame in the second video picture area by using a target object detection technology before displaying each video image frame, so as to obtain an object detection result of the video image frame.

In an embodiment of the present disclosure, the target object may be preset as needed, and is not limited herein.

For example, the target object may include a human face, a person, an animal face, an animal, an object, a building, and so on.

Taking the target object as a human face as an example, before playing the target video, the electronic device may acquire a display position of the target video text in the video data to which the target video belongs, and then, in the process of playing the target video, in the case where the display position of the target video text is a second video picture area of the target video, before displaying each video image frame, human face detection is respectively performed on the image picture of the video image frame in the second video picture area, so as to obtain a human face detection result of the video image frame.

In some embodiments, the second target interface may have a plurality of picture detection areas.

In an embodiment of the present disclosure, the picture detection area may be preset as needed, and is not limited herein.

For example, the second target interface may be divided into nine equal divisions so that the second target interface may have 9 picture detection areas.

Correspondingly, performing target object detection on the image picture of each video image frame in the second video picture area respectively to obtain an object detection result of each video image frame may specifically include:

performing target object detection on image picture of each video image frame in the picture detection area to which the second video picture area belongs respectively to obtain an object detection result of each video image frame.

In some embodiments, taking a video image frame as an example, the electronic device may first obtain an image picture of the video image frame located in a picture detection area to which a second video picture area belongs, then input the image picture into a target object detection model obtained through pre-training to obtain an object detection result corresponding to the image picture, and further take the object detection result corresponding to the image picture as an object detection result of the video image frame.

In other embodiments, taking a video image frame as an example, the electronic device may first input the video image frame into a target object detection model obtained through pre-training to obtain a position of a target object in the video image frame, further determine a picture detection area where the target object is located in a second target interface according to the position, then compare the picture detection area with a picture detection area to which the second video picture area belongs, and take a comparison result as an object detection result of the video image frame. And if the comparison result shows that there is at least one same picture detection area, the object detection result indicates that there is a video main body, otherwise, the object detection result indicates that there is no video main body.

S1530, when the object detection result indicates that no target object exists, the video image frame to which the object detection result belongs is displayed, and the target video text corresponding to the video image frame to which the object detection result belongs is displayed in the second video picture area.

In an embodiment of the present disclosure, before the electronic device displays each video image frame, after determining the target object detection result of the video image frame, if the electronic device determines that the object detection result is that no target object exists, the video image frame may be displayed, and the target video text corresponding to the video image frame is displayed in the second video picture area.

Further, after the electronic device displays the target video text corresponding to the video image frame to which the object detection result belongs in the second video picture area, the electronic device may continue to perform target object detection on the image picture of each video image frame in the second video picture area, respectively, so as to obtain the object detection result of each video image frame, and further determine whether to display the target video text in the second video picture area.

That is, after the electronic device displays the target video text corresponding to the video image frame to which the information detection result belongs in the second video picture area, it may directly return to S1520.

S1540, in the case where the object detection result indicates that the target object exists, the video image frame to which the object detection result belongs is displayed, and the target video text corresponding to the video image frame to which the object detection result belongs is displayed in the first video picture area.

In an embodiment of the present disclosure, before the electronic device displays each video image frame, after determining the target object detection result of the video image frame, if the electronic device determines that the object detection result is that there is a target object, the video image frame may be displayed, and the target video text corresponding to the video image frame to which the object detection result belongs is displayed in the first video picture area.

Figure 16:
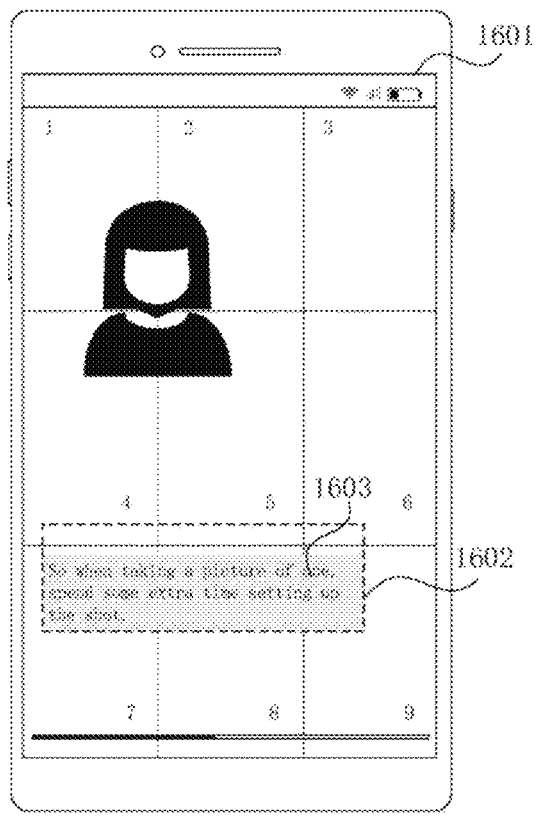
FIG. 16 is a schematic diagram of a picture detection area provided by an embodiment of the present disclosure.

FIG. 16 shows a schematic diagram of a picture detection area provided by an embodiment of the present disclosure.

As shown in FIG. 16, the electronic device may display a video play interface 1601, and a video image frame of a target video may be displayed in the video play interface 1601. The video play interface 1601 may be divided into 9 equal picture detection areas. Wherein, the face detection result of picture detection areas 1 and 2 is that a face exists, and the face detection results of picture detection areas 3-9 are that no face exists.

In the case where the display position of the target video text is the second video picture area of the target video, the picture detection areas to which the second video picture area belongs are the picture detection areas 1 and 2, and the face detection result of the picture detection areas 1 and 2 is that a face exists, so that a target video text 1603 can be displayed in a first video picture area 1602 while the current video image frame is displayed.

In some embodiments, a method for displaying a target video text in the first video picture area is similar to the method for displaying the target video text in the second video picture area in the embodiment shown in FIG. 11, and fine adjustment may also be performed according to the interface element, which is not described herein again.

Further, after the electronic device displays the target video text corresponding to the video image frame to which the object detection result belongs in the first video picture area, the electronic device may keep displaying the target video text in the first video picture area for a preset time period, and continue to perform target object detection on the image picture of each video image frame in the second video picture area, respectively, after the preset time period to obtain the object detection result of each video image frame, thereby determining whether to display the target video text in the second video picture area.

That is, if the electronic device determines that the object detection result is that target object exists, the target video text may be kept displayed in the first video picture area for a preset time period, during which the target object detection does not need to be performed on the image picture of each video image frame in the second video picture area, and S1520 may be directly performed until after the preset time period.

Therefore, in the embodiment of the present disclosure, the electronic device can identify the position of the target object of the target video, and display the target video text avoiding the target object, so as to improve the experience and feeling of the video viewer when watching the video.

An embodiment of the present disclosure further provides a video editing apparatus for implementing the above video editing method, which is described below with reference to FIG. 17. In an embodiment of the present disclosure, the video editing apparatus may be an electronic device, for example, the video editing apparatus may be the first electronic device 101 in the client side illustrated in FIG. 1. The electronic device may include a mobile phone, a tablet computer, a desktop computer, a notebook computer, a vehicle-mounted terminal, a wearable electronic device, an all-in-one machine, a smart home device and other devices with communication functions, and may also include a virtual machine or a simulator-simulated device.

Figure 17:
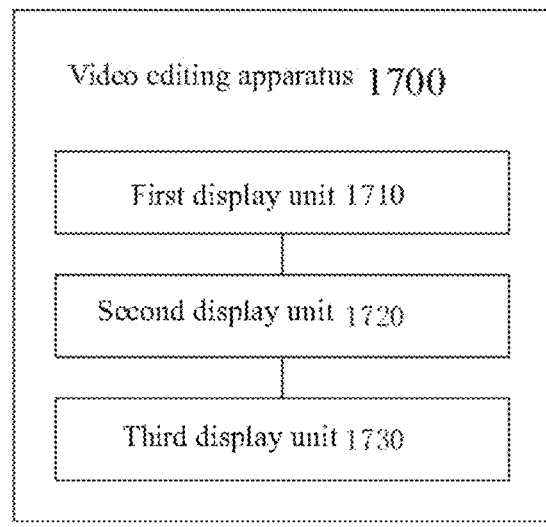
FIG. 17 is a schematic structural diagram of a video editing apparatus provided by an embodiment of the present disclosure.

FIG. 17 shows a schematic structural diagram of a video editing apparatus provided by an embodiment of the present disclosure.

As shown in FIG. 17, a video editing apparatus 1700 can include a first display unit 1710, a second display unit 1720, and a third display unit 1730.

The first display unit 1710 may be configured to display a target video.

The second display unit 1720 may be configured to display a target video text within a first video picture area of the target video.

The third display unit 1730 may be configured to, upon detection of a moving operation on the target video text, move the target video text from the first video picture area to a second video picture area for display in the case where it is determined that the moving operation is used for moving the target video text to the second video picture area of the target video.

In an embodiment of the present disclosure, a target video text can be displayed in a first video picture area of a target video when the target video is displayed, and when a moving operation on the target video text is detected, the target video text can be moved from the first video picture area to a second video picture area for display in a case where it is determined that the moving operation is used to move the target video text to the second video picture area of the target video, so as to update the display position of the target video text from the first video picture area to the second video picture area, so that the target video text can be directly displayed in the second video picture area of the target video in the playing process of the target video when the target video is subsequently played, thereby adjusting the display position of the target video text as required, for example, if the main content of the video is in the first video picture area, the video text can be moved to the second video picture area for display, so that the main content of the video is prevented from being obscured by the video text, and the video viewing experience of a user is improved.

In some embodiments of the present disclosure, the first display unit 1710 may be further configured to display the target video in a first target interface.

The first target interface may have a first preset reference line, and the first video picture area and the second video picture area may be located on two sides of the first preset reference line, respectively.

In some embodiments of the present disclosure, the first target interface may further have a first interface boundary line and a second interface boundary line, and the first interface boundary line and the second interface boundary line may be located on two sides of the first preset reference line, respectively.

Accordingly, an area position of the first video picture area may be determined based on the first interface boundary line, and an area position of the second video picture area may be determined based on the second interface boundary line.

In some embodiments of the present disclosure, the second display unit 1720 may be further configured to display, in the first video picture area, the target video text in alignment with a first area boundary of the first video picture area, the first area boundary being an area boundary of the first video picture area far away from the first preset reference line.

Accordingly, the third display unit 1730 may be further configured to move the target video text from the first video picture area to the second video picture area; and in the second video picture area, the target video text is displayed in alignment with a second area boundary of the second video picture area, the second area boundary being an area boundary of the second video picture area far away from the first preset reference line.

In some embodiments of the present disclosure, the target video text may be displayed in a video text box.

When the target video text is displayed in the first video picture area, the alignment border of the video text box can comprise a first border of the video text box close to the first area boundary, and the target video text is displayed in alignment with the first border; when the target video text is displayed in the second video picture area, the alignment border may include a second border of the video text box close to the second area boundary, and the target video text is displayed in alignment with the second border.

In some embodiments of the present disclosure, the video editing apparatus 1700 may further include a first detection unit, a border determination unit, and a fifth display unit.

The first detection unit may be configured to detect the real-time position of a target border of the video text box during the movement of the target video text, wherein the target border comprises at least one of the first border and the second border.

The border determination unit may be configured to determine the alignment border in the first border and the second border according to a relative position between the real-time position and the first preset reference line.

The fifth display unit may be configured to display the target video text in alignment with the alignment border.

In some embodiments of the present disclosure, the video editing apparatus 1700 may further include a second detection unit, and the second detection unit may be configured to detect a real-time moving direction of the target video text during the moving process.

Accordingly, the border determination unit may be further configured to determine the alignment border in the first border and the second border according to the relative position between the real-time position and the first preset reference line and the real-time moving direction.

In some embodiments of the present disclosure, the video editing apparatus 1700 may further include a size adjustment unit, and the size adjustment unit may be configured to adjust a text box size of the video text box according to a text size of the target video text by using the alignment border as a text box fixed axis.

In some embodiments of the present disclosure, the video editing apparatus 1700 may further include a sixth display unit, and the sixth display unit may be configured to change the transparency of the target video text from a first transparency to a second transparency during the movement of the target video text.

Where the first transparency is a transparency before the target video text is moved, and the second transparency is larger than the first transparency.

In some embodiments of the present disclosure, the moving operation may include a drag operation on the target video text.

Accordingly, the video editing apparatus 1700 may further include a first acquisition unit, a weight calculation unit, and an area determination unit.

The first acquisition unit may be configured to acquire a real-time drag position of the drag operation and a real-time drag speed of the drag operation when the drag operation ends.

The weight calculation unit can be configured to perform a weighted summation calculation on the real-time drag position and the real-time drag speed to obtain an operation weight of the drag operation.

The area determination unit may be configured to determine that the moving operation is used for moving the target video text to the second video picture area for display in the case where the operation weight indicates that the target video text is displayed in the second video picture area.

It should be noted that the video editing apparatus 1700 shown in FIG. 17 may perform each step in the method embodiments shown in FIG. 2 to FIG. 10, and implement each process and effect in the method embodiments shown in FIG. 2 to FIG. 10, which are not described herein again.

An embodiment of the present disclosure further provides a video play apparatus for implementing the above video playing method, which is described below with reference to FIG. 18. In an embodiment of the present disclosure, the video play apparatus may be an electronic device, for example, the video play apparatus may be the second electronic device 102 in the client side illustrated in FIG. 1. The electronic device may include a mobile phone, a tablet computer, a desktop computer, a notebook computer, a vehicle-mounted terminal, a wearable electronic device, an all-in-one machine, a smart home device and other devices with communication functions, and may also include a virtual machine or a simulator-simulated device.

Figure 18:
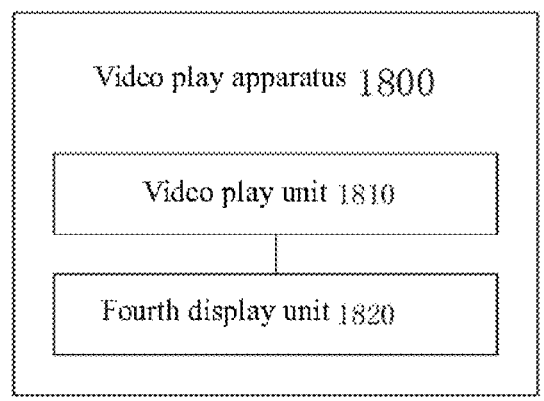
FIG. 18 is a schematic structural diagram of a video playing apparatus provided by an embodiment of the present disclosure.

FIG. 18 shows a schematic structural diagram of a video play apparatus provided by an embodiment of the present disclosure.

As shown in FIG. 18, the video play apparatus 1800 may include a video play unit 1810 and a fourth display unit 1820.

The video play unit 1810 can be configured to play a target video.

The fourth display unit 1820 may be configured to display the target video text in the second video picture area of the target video in the playing process of the target video.

The second video picture area may be a video picture area to which the target video text is moved from a first video picture area, which is determined in the process of video editing of the target video.

In an embodiment of the present disclosure, the electronic device may display the target video text based on the adjusted display position of the target video text, for example, if the main content of the video is in the first video picture area, the target video text may be displayed in the second video picture area to prevent the target video text from blocking the main content of the video, so that the video viewing experience of the user is improved.

In some embodiments of the present disclosure, the video play unit 1810 may be further configured to play the target video in a second target interface.

Accordingly, the second target interface may have a second preset reference line, and the first video picture area and the second video picture area may be respectively located on two sides of the second preset reference line.

Accordingly, the fourth display unit 1820 may be further configured to display, in the second video picture area, the target video text in alignment with a second area boundary of the second video picture area, the second area boundary being an area boundary of the second video picture area far away from the second preset reference line.

In some embodiments of the present disclosure, the second target interface may further have a third interface boundary line, and the third interface boundary line and the second video picture area may be located on the same side of the second preset reference line.

In the case where the third interface boundary line is located in a non-interface element display area of the target video, the area position of the second video picture area may be determined according to the third interface boundary line, and in the case where the third interface boundary line is located in an interface element display area of the target video, the area position of the second video picture area may be determined according to a target boundary line corresponding to the third interface boundary line, and the target boundary line may be located in the non-interface element display area.

In some embodiments of the present disclosure, the target video may include a plurality of video image frames.

Accordingly, the video play apparatus 1800 may further include a subject detection unit, and the subject detection unit may be configured to perform target object detection on an image picture of each video image frame in the second video picture area respectively to obtain an object detection result of each video image frame.

Accordingly, the fourth display unit 1820 may be further configured to display, in the second video picture area, the target video text corresponding to the video image frame to which the object detection result belongs, in the case where the object detection result indicates that the target object does not exist.

In some embodiments of the present disclosure, the video play apparatus 1800 may further include a seventh display unit, and the seventh display unit may be configured to display, in the first video picture area, the target video text corresponding to the video image frame to which the object detection result belongs, in the case where the object detection result indicates that the target object exists.

It should be noted that the video play apparatus 1800 shown in FIG. 18 may perform each step in the method embodiments shown in FIG. 11 to FIG. 16, and implement each process and effect in the method embodiments shown in FIG. 11 to FIG. 16, which are not described herein again.

An embodiment of the present disclosure also provides an electronic device that may include a processor and a memory that may be used to store executable instructions. The processor may be configured to read the executable instructions from the memory and execute the executable instructions to implement the video editing method and/or the video playing method in the foregoing embodiments.

Figure 19:
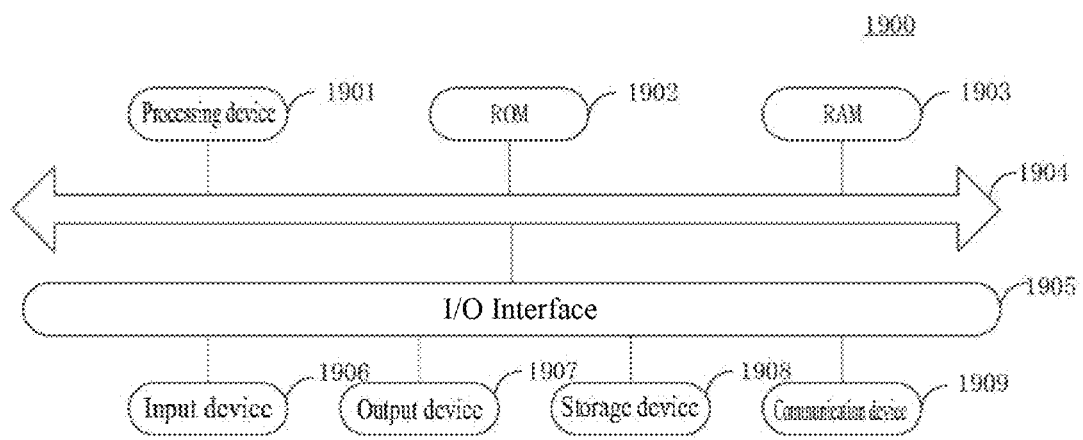
FIG. 19 is a schematic structural diagram of an electronic device provided by an embodiment of the present disclosure.

FIG. 19 shows a schematic structural diagram of an electronic device provided by an embodiment of the present disclosure. Referring below specifically to FIG. 19, which shows a schematic structural diagram suitable for implementing an electronic device 1900 in an embodiment of the present disclosure.

The electronic device 1900 in the embodiments of the present disclosure may include, but is not limited to, a mobile terminal such as a mobile phone, a notebook computer, a digital broadcast receiver, a PDA (personal digital assistant), a PAD (tablet), a PMP (portable multimedia player), a vehicle terminal (e.g., a car navigation terminal), a wearable device, and the like, and a fixed terminal such as a digital TV, a desktop computer, a smart home device, and the like.

It should be noted that the electronic device 1900 shown in FIG. 19 is only an example, and should not bring any limitation to the functions and the scope of the application of the embodiment of the present disclosure.

As shown in FIG. 19, the electronic device 1900 may include a processing device (e.g., a central processer, a graphics processor, etc.) 1901 that may perform various appropriate actions and processes according to a program stored in a read-only memory (ROM) 1902 or a program loaded from a storage device 1908 into a random access memory (RAM) 1903. In the RAM 1903, various programs and data necessary for the operation of the electronic device 1900 are also stored. The processing device 1901, ROM 1902, and RAM 1903 are connected to each other via a bus 1904. An input/output (I/O) interface 1905 is also connected to the bus 1904.

Generally, the following devices can be connected to the I/O interface 1905: an input device 1906 including, for example, a touch screen, touch pad, keyboard, mouse, camera, microphone, accelerometer, gyroscope, etc.; an output device 1907 including, for example, a Liquid Crystal Display (LCD), speaker, vibrator, etc.; a storage device 1908 including, for example, magnetic tape, hard disk, etc.; and a communication device 1909. The communication device 1909 may allow the electronic device 1900 to perform wireless and wired communication with other devices to exchange data. While FIG. 19 illustrates an electronic device 1900 having various means, it is to be understood that it is not required to implement or provide all of the means shown. More or fewer means may be alternatively implemented or provided.

An embodiment of the present disclosure also provides a computer readable storage medium, the storage medium stores a computer program which, when executed by a processor, causes the processor to implement the video editing method or the video playing method in the above embodiments.

In particular, the processes described above with reference to the flow diagrams may be implemented as computer software programs, according to an embodiment of the present disclosure.

An embodiment of the present disclosure also provides a computer program product, which may include a computer program that, when executed by a processor, causes the processor to implement the video editing method or the video playing method in the above embodiments.

For example, an embodiment of the present disclosure includes a computer program product comprising a computer program carried on a non-transitory computer readable medium, the computer program containing program code for performing the method illustrated by the flow diagram. In such an embodiment, the computer program may be downloaded and installed from the network via the communication device 1909, or installed from the storage device 1908, or installed from the ROM 1902. When executed by the processing device 1901, the computer program performs the above-described functions defined in the video editing method or the video playing method of an embodiment of the present disclosure.

It should be noted that the above computer readable medium of the present disclosure may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer readable storage medium may be any tangible medium that contains, or stores a program for use by or in combination with an instruction execution system, apparatus, or device. In contrast, in the present disclosure, a computer readable signal medium may include a data signal propagated in a baseband or as a part of a carrier wave, wherein a computer readable program code is carried therein. Such a propagated data signal may take a variety of forms, including, but not limited to, an electro-magnetic signal, an optical signal, or any suitable combination thereof. A computer readable signal medium may be any computer readable medium other than a computer readable storage medium and the computer readable signal medium can communicate, propagate, or transport a program for use by or in combination with an instruction execution system, apparatus, or device. Program code embodied on a computer readable medium may be transmitted using any appropriate medium, including but not limited to: electrical wires, optical cables, RF (radio frequency), etc., or any suitable combination thereof.

In some embodiments, the client and the server can communicate using any currently known or future-developed network protocol, such as HTTP, and may be interconnected to digital data communication (e.g., a communication network) of any form or medium. Examples of communication networks include a local area network ("LAN"), a wide area network ("WAN"), the Internet (e.g., the Internet), and a peer-to-peer network (e.g., ad hoc peer-to-peer network), as well as any currently known or future developed network.

The above-mentioned computer readable medium may be included in the above-mentioned electronic device; or it may exist alone without being assembled into the electronic device.

The above-mentioned computer readable medium carries one or more programs which, when executed by the electronic device, cause the electronic device to perform the following operations:

displaying a target video; displaying a target video text in a first video picture area of the target video; upon detection of a moving operation on the target video text, moving the target video text from the first video picture area to a second video picture area for display in the case where the moving operation is determined to be used for moving the target video text to the second video picture area of the target video.

Or playing a target video, and displaying a target video text in a second video picture area of the target video in the playing process of the target video, wherein the second video picture area is a video picture area to which the target video text is moved from a first video picture area, which is determined in the process of video editing of the target video.

In an embodiment of the present disclosure, computer program code for carrying out operations of the present disclosure may be written in one or more programming languages or a combination thereof, the programming languages include, but are not limited to an object oriented programming language such as Java, Smalltalk, C++, and also include conventional procedural programming languages, such as the "C" programming language, or similar programming languages. The program code can be executed entirely on the user's computer, partly on the user's computer, as an independent software package, partly on the user's computer and partly on a remote computer, or entirely on the remote computer or server. In the scenario involving a remote computer, the remote computer may be connected to the user's computer through any type of network, including a Local Area Network (LAN) or a Wide Area Network (WAN), or may be connected to an external computer (for example, through the Internet connection using an Internet service provider).

The flow diagrams and block diagrams in the figures illustrate the architecture, functionality, and operation that are possibly implemented by systems, methods and computer program products according to various embodiments of the present disclosure. In this regard, each block in the flow diagrams or block diagrams may represent a module, program segment, or portion of code, which comprises one or more executable instructions for implementing the specified logical function(s). It should also be noted that, in some alternative implementations, the functions noted in the blocks may occur in an order different from that noted in the figures. For example, two blocks shown in succession may, in fact, be executed substantially concurrently, or they may sometimes be executed in a reverse order, depending upon the function involved. It will also be noted that each block of the block diagrams and/or flow diagrams, and a combination of blocks in the block diagrams and/or flow diagrams, can be implemented by special purpose hardware-based systems that perform the specified functions or operations, or combinations of special purpose hardware and computer instructions.

The units described in the embodiments of the present disclosure may be implemented by software or hardware. Wherein the name of a unit does not in some cases constitute a limitation on the unit itself.

The functions described herein above may be performed, at least in part by one or more hardware logic components. For example, without limitation, exemplary types of hardware logic components that may be used include Field Programmable Gate Arrays (FPGAs), Application Specific Integrated Circuits (ASICs), Application Specific Standard Products (ASSPs), Systems on a Chip (SOCs), Complex Programmable Logic Devices (CPLDs), and so forth.

In the context of this disclosure, a machine readable medium may be a tangible medium that can contain, or store a program for use by or in combination with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination thereof. More specific examples of the machine readable storage medium would include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof.

The above descriptions are only preferred embodiments of the present disclosure and are illustrative of the principles of the technology employed. It will be appreciated by those skilled in the art that the scope of disclosure of the present disclosure is not limited to the technical solutions formed by specific combinations of the above-described technical features, and should also encompass other technical solutions formed by any combination of the above-described technical features or equivalents thereof without departing from the concept of the present disclosure. For example, the technical solutions formed by replacing the above-described features with features disclosed in the present disclosure (but not limited to) having similar functions.

Further, although operations are depicted in a particular order, this should not be understood as requiring such operations to be performed in the particular order shown or in sequential order execution. Under certain circumstances, multitasking and parallel processing may be advantageous. Likewise, although several specific implementation details are included in the above discussion, these should not be construed as limitations on the scope of the present disclosure. Certain features that are described in the context of a single embodiment can also be implemented in combination in a single embodiment. Conversely, various features that are described in the context of a single embodiment can also be implemented in multiple embodiments separately or in any suitable subcombination.

Although the present subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A video editing method, comprising:
   displaying a target video in a first target interface;
   displaying a target video text in a first video picture area of the target video; and
   in response to detection of a moving operation on the target video text and determining that the moving operation is configured for moving the target video text across a first preset reference line in the first target interface to a second video picture area of the target video, moving the target video text from the first video picture area to the second video picture area for display,
   wherein the first video picture area and the second video picture area are located on two sides of the first preset reference line, and
   wherein the target video text is displayed in a video text box; and during movement of the target video text, the target video text is displayed in alignment with an alignment border of the video text box, wherein the alignment border is determined according to a relative position between a real-time position of a target border of the video text box and the first preset reference line in real time; and the target border comprises at least one of the alignment border when the target video text is displayed in the first video picture area and the alignment border when the target video text is displayed in the second video picture area.

2. The method according to claim 1, wherein the first target interface further has a first interface boundary line and a second interface boundary line, and the first interface boundary line and the second interface boundary line are respectively located on two sides of the first preset reference line; and
   wherein an area position of the first video picture area is determined according to the first interface boundary line, and an area position of the second video picture area is determined according to the second interface boundary line.

3. The method of claim 2,
   wherein when the target video text is displayed in the first video picture area, an alignment border of the video text box comprises a first border closest to the first area boundary of the video text box, and the target video text is displayed in alignment with the first border;
   when the target video text is displayed in the second video picture area, the alignment border comprises a second border closest to the second area boundary of the video text box, and the target video text is displayed in alignment with the second border.

4. The method according to claim 3, wherein the method further comprises:
   detecting the real-time position of the target border of the video text box during movement of the target video text, wherein the target border comprises at least one of the first border and the second border;
   determining the alignment border in the first border and the second border according to a relative position between the real-time position and the first preset reference line; and
   displaying the target video text in alignment with the alignment border.

5. The method according to claim 4, wherein before the determining the alignment border in the first border and the second border according to the relative position between the real-time position and the first preset reference line, the method further comprises:
   detecting a real-time moving direction of the target video text during the movement;
   wherein the determining the alignment border in the first border and the second border according to the relative position between the real-time position and the first preset reference line includes:
   determining the alignment border in the first border and the second border according to the relative position between the real-time position and the first preset reference line and the real-time moving direction.

6. The method according to claim 3, wherein the method further comprises:
   adjusting a text box size of the video text box by taking the alignment border as a text box fixed axis according to a text size of the target video text.

7. The method of claim 1, wherein the displaying the target video text in the first video picture area of the target video comprises:
   in the first video picture area, displaying the target video text in alignment with a first area boundary of the first video picture area, the first area boundary being an area boundary furthest from the first preset reference line of the first video picture area;
   wherein the moving the target video text from the first video picture area to the second video picture area for display comprises:
   moving the target video text from the first video picture area to the second video picture area; and
   in the second video picture area, displaying the target video text in alignment with a second area boundary of the second video picture area, the second area boundary being an area boundary furthest from the first preset reference line of the second video picture area.

8. The method of claim 1, wherein the method further comprises:
   changing a transparency of the target video text from a first transparency to a second transparency during a movement of the target video text;

wherein the first transparency is a transparency before the target video text is moved, and the second transparency is larger than the first transparency.

9. The method of claim 1, wherein the moving operation comprises a drag operation on the target video text;
wherein the determining that the moving operation is configured for moving the target video text to the second video picture area of the target video comprises:
when the drag operation ends, acquiring a real-time drag position of the drag operation and a real-time drag speed of the drag operation;
performing a weighted summation calculation on the real-time drag position and the real-time drag speed to obtain an operation weight of drag operation; and
in response to the operation weight indicating that the target video text is displayed in the second video picture area, determining that the moving operation is used configured for moving the target video text to the second video picture area for display.

10. A video playing method, comprising:
playing a target video, wherein the target video is a video edited by the video editing method of claim 1; and
in a playing process of the target video, displaying the target video text in a video picture area which is determined to display the target video text in a process of video editing of the target video, including displaying the target video text in the first video picture area or in the second video picture area.

11. The method of claim 10,
wherein the displaying the target video text in the second video picture area comprises:
in the second video picture area, displaying the target video text in alignment with a second area boundary of the second video picture area, the second area boundary being an area boundary furthest from the second preset reference line of the second video picture area.

12. The method of claim 11, wherein the second target interface further has a third interface boundary line, and the third interface boundary line and the second video picture area are located on a same side of the second preset reference line;
wherein in the case where the third interface boundary line is located in a non-interface element display area of the target video, an area position of the second video picture area is determined according to the third interface boundary line, and in the case where the third interface boundary line is located in an interface element display area of the target video, the area position of the second video picture area is determined according to a target boundary line corresponding to the third interface boundary line, the target boundary line being located in the non-interface element display area.

13. The method of claim 10, wherein the target video comprises a plurality of video image frames;
wherein, before the displaying the target video text in the second video picture area, the method further comprises:
performing target object detection on an image picture of each video image frame in the second video picture area respectively to obtain an object detection result of each video image frame; and
wherein the displaying the target video text in the second video picture area comprises:
in the case where the object detection result indicates that no target object exists, displaying the target video text corresponding to the video image frame to which the object detection result belongs in the second video picture area.

14. The method of claim 13, wherein after the performing target object detection on the image picture of each video image frame in the second video picture area respectively to obtain the object detection result of each video image frame, the method further comprises:
in the case where the object detection result indicates that a target object exists, displaying the target video text corresponding to the video image frame to which the object detection result belongs in the first video picture area.

15. An electronic device, comprising:
a processor;
a memory for storing executable instructions;
wherein the processor is configured to read the executable instructions from the memory and execute the executable instructions to implement the video editing method of claim 1.

16. A non-transitory computer readable storage medium, wherein the storage medium stores a computer program that, when executed by a processor, causes the processor to implement the video editing method of claim 1.

* * * * *